United States Patent [19]

Ohhashi

[11] Patent Number: 5,305,204

[45] Date of Patent: Apr. 19, 1994

[54] DIGITAL IMAGE DISPLAY APPARATUS WITH AUTOMATIC WINDOW LEVEL AND WINDOW WIDTH ADJUSTMENT

[75] Inventor: Akinami Ohhashi, Washimiya, Japan

[73] Assignee: Kabushiki Kaisha Toshiba, Kawasaki, Japan

[21] Appl. No.: 552,520

[22] Filed: Jul. 16, 1990

[30] Foreign Application Priority Data

| Jul. 19, 1989 | [JP] | Japan | 1-186819 |
| Mar. 16, 1990 | [JP] | Japan | 2-66695 |
| Mar. 16, 1990 | [JP] | Japan | 2-66696 |
| Mar. 16, 1990 | [JP] | Japan | 2-66697 |

[51] Int. Cl.$^5$ .................. G06F 15/42; G06F 15/68
[52] U.S. Cl. ....................... 364/413.13; 364/413.22
[58] Field of Search ............ 364/413.13, 413.16, 364/413.19, 413.22; 382/6, 50, 51, 54; 378/99, 901; 358/111, 169

[56] References Cited

U.S. PATENT DOCUMENTS

| 4,638,162 | 1/1987 | Tanaka et al. | 364/413.13 |
| 4,731,863 | 3/1988 | Sezan et al. | 364/413.13 |
| 4,755,954 | 7/1988 | Netter | 364/413.13 |
| 5,042,077 | 8/1991 | Burke | 364/413.16 |
| 5,157,733 | 10/1992 | Takeo et al. | 364/413.13 |

FOREIGN PATENT DOCUMENTS

| 0136652 | 4/1985 | European Pat. Off. |
| 0283255 | 9/1988 | European Pat. Off. | 364/413.13 |
| 0312596 | 4/1989 | European Pat. Off. |
| 63-84526 | 4/1988 | Japan. |

Primary Examiner—Robert A. Weinhardt
Attorney, Agent, or Firm—Oblon, Spivak, McClelland, Maier & Neustadt

[57] ABSTRACT

A digital image display apparatus for converting a pixel value of medical digital image data such as MRI image data or CT image data into brightness in accordance with a display window including a window level and a window width of a display unit, determines the optimum window level and width for each image as follows. The apparatus obtains a histogram of pixel values from the digital image data and calculates brightness data of a pixel value having a highest frequency, brightness data of a pixel value at a boundary between a background and an image, area data of a portion having middle brightness within a display brightness range, area data of a portion having maximum brightness, and data indicating a ratio between an area of a portion having higher brightness than the middle brightness and an area of a portion having lower brightness than that obtained, when the digital image is to be displayed by a given display window on the basis of the histogram. The apparatus obtains image quality indicating clarity of the image displayed by the given window on the basis of the above data by using arithmetic operations or by using a neural network, thereby determining the optimum display window which provides a maximum image quality.

36 Claims, 23 Drawing Sheets

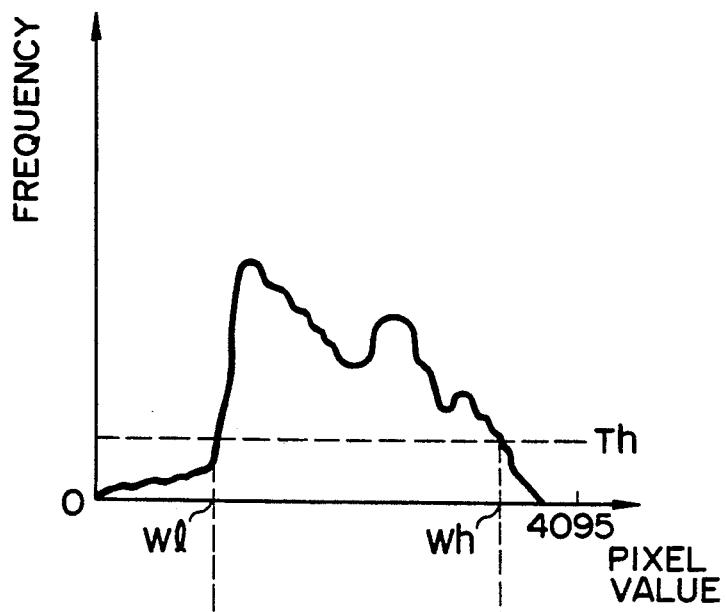
F I G. 1A
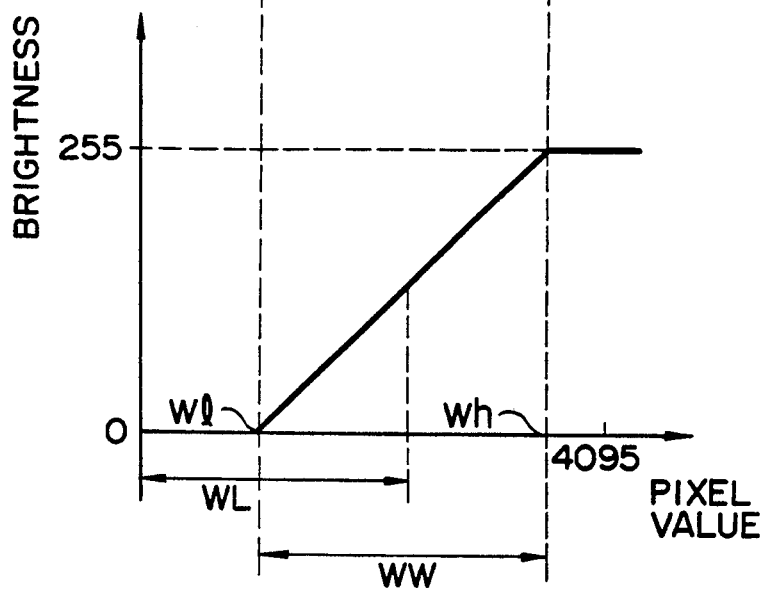
F I G. 1B

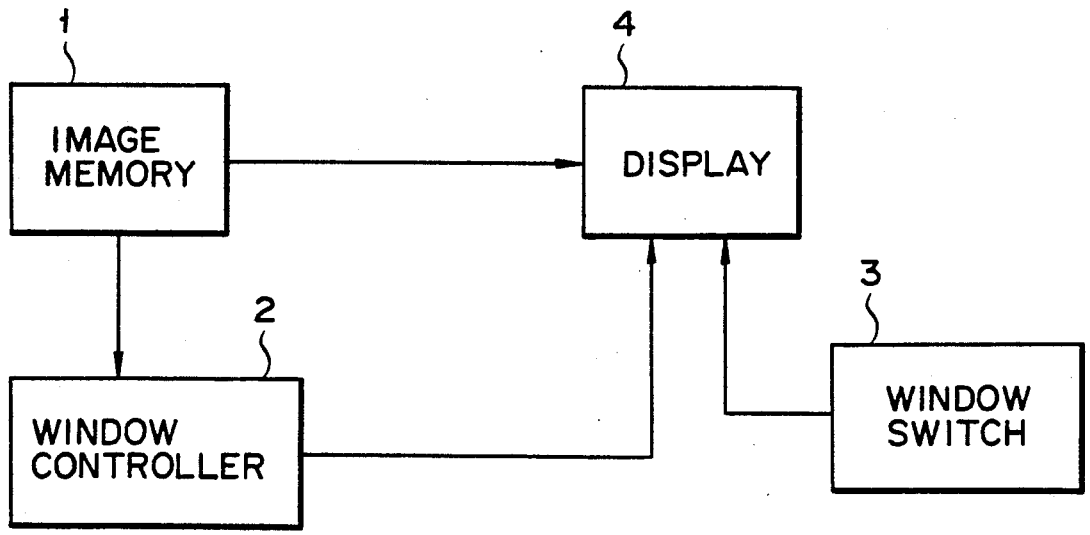
F I G. 2
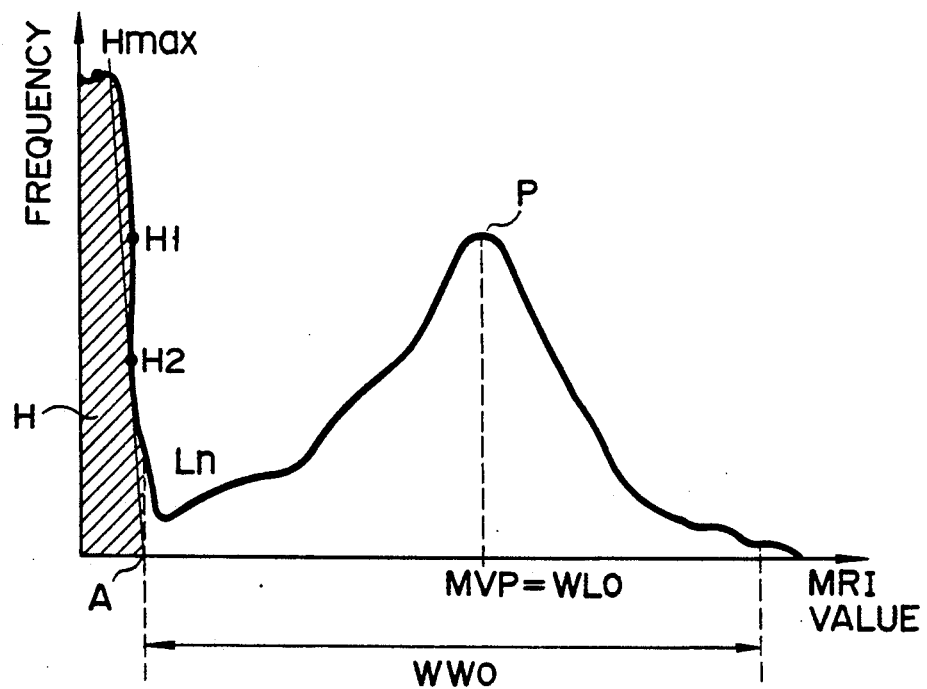
F I G. 4

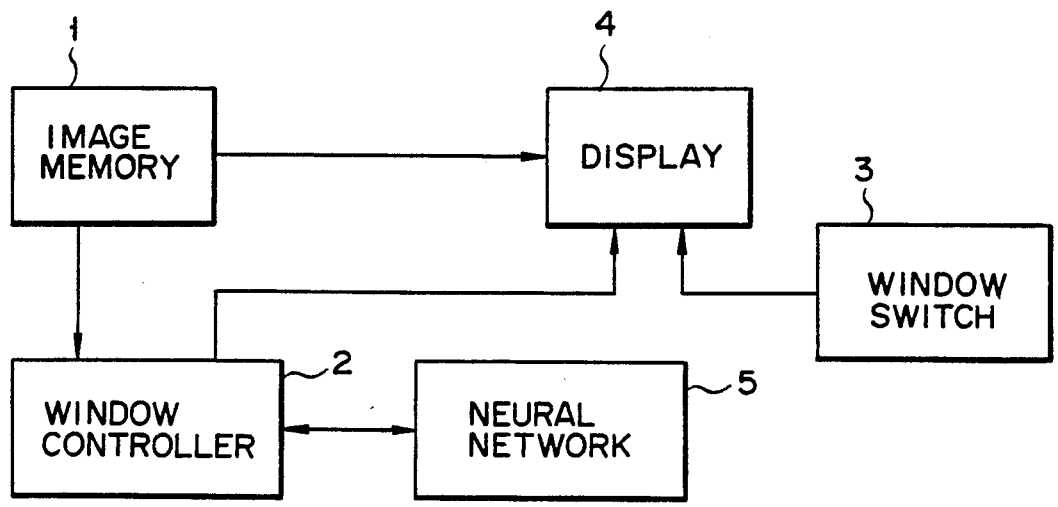
F I G. 10
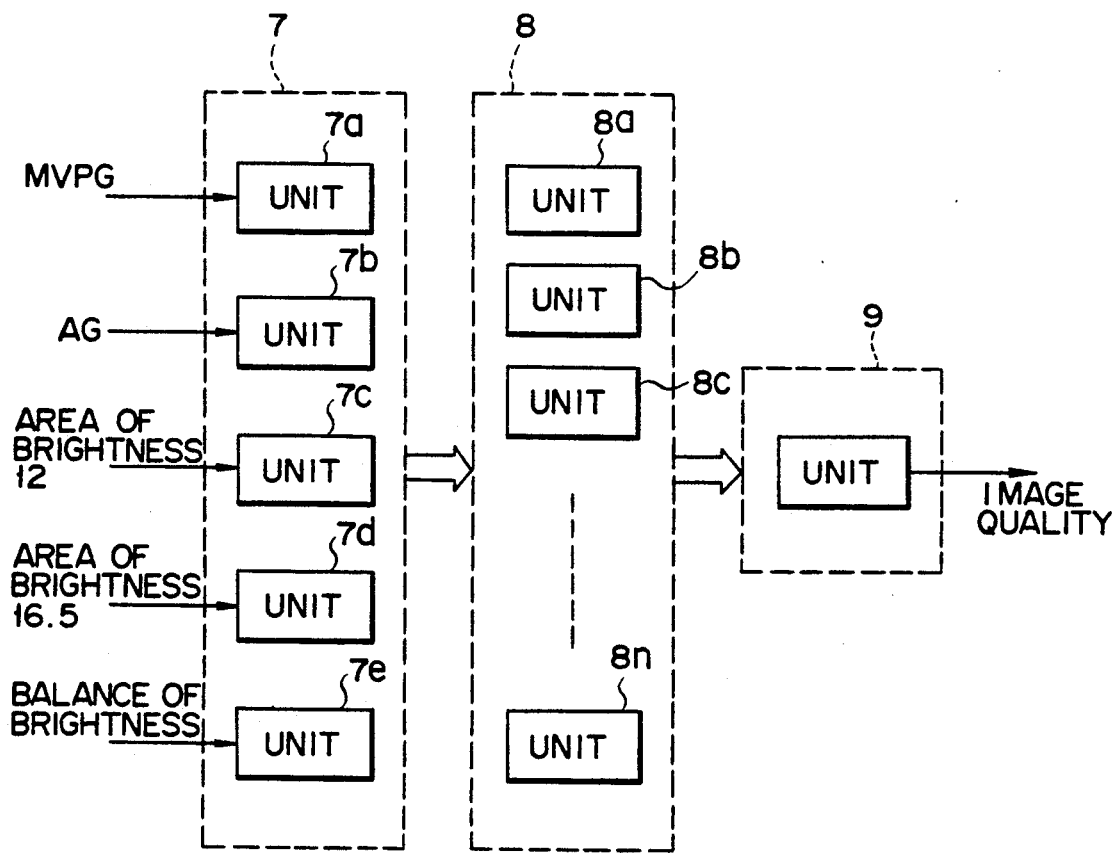
F I G. 13

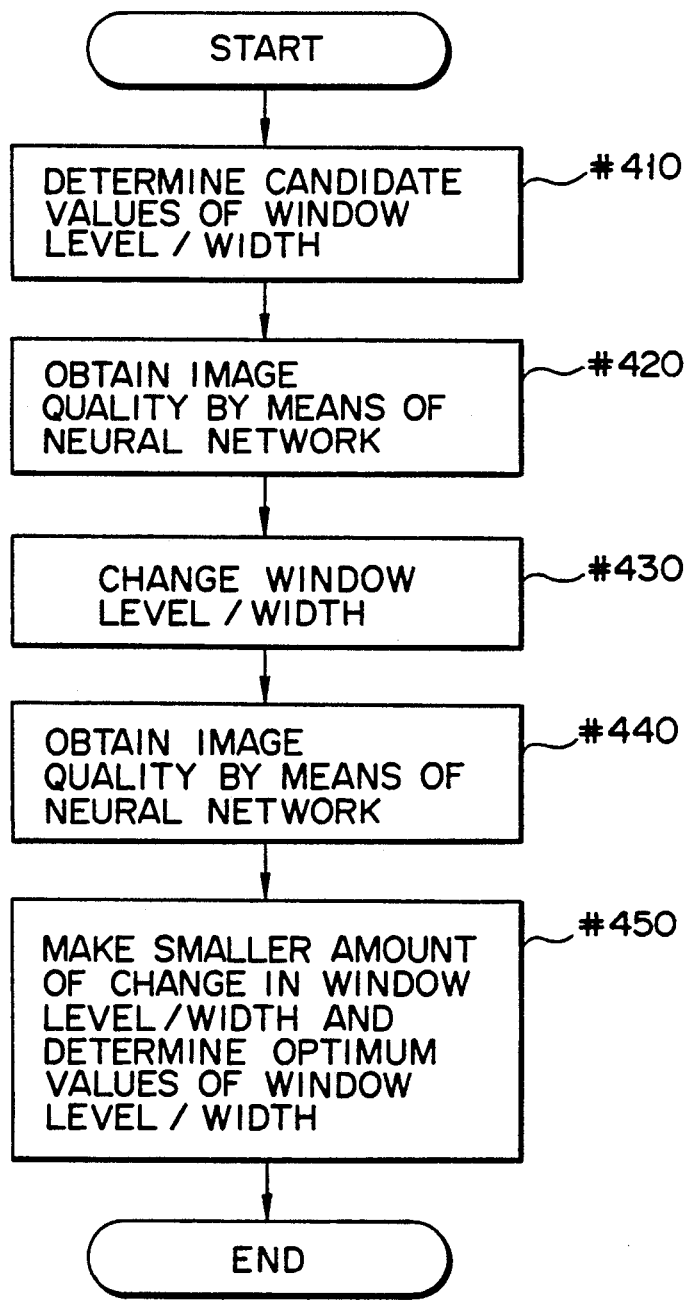
F I G. 12

| WL / WW | $WLG - \frac{WWG}{2}$ | $WLG - \frac{WWG}{4}$ | WLG | $WLG + \frac{WWG}{4}$ | $WLG + \frac{WWG}{2}$ |
|---|---|---|---|---|---|
| $WWG - \frac{WWG}{2}$ | 0.29 | 0.46 | 0.79 | 0.46 | 0.18 |
| $WWG - \frac{WWG}{4}$ | 0.30 | 0.54 | 0.92 | 0.56 | 0.23 |
| WWG | 0.33 | 0.62 | 1.00 | 0.64 | 0.32 |
| $WWG + \frac{WWG}{4}$ | 0.39 | 0.68 | 0.95 | 0.69 | 0.41 |
| $WWG + \frac{WWG}{2}$ | 0.45 | 0.71 | 0.89 | 0.72 | 0.49 |

FIG. 15

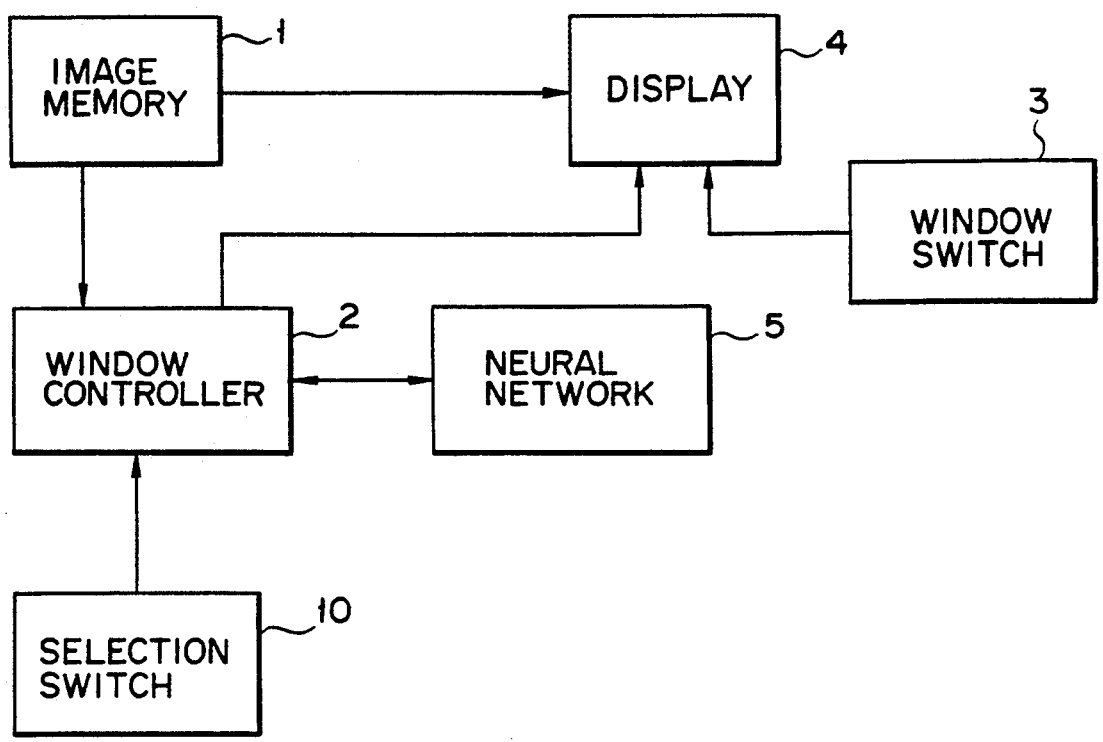
F I G. 16
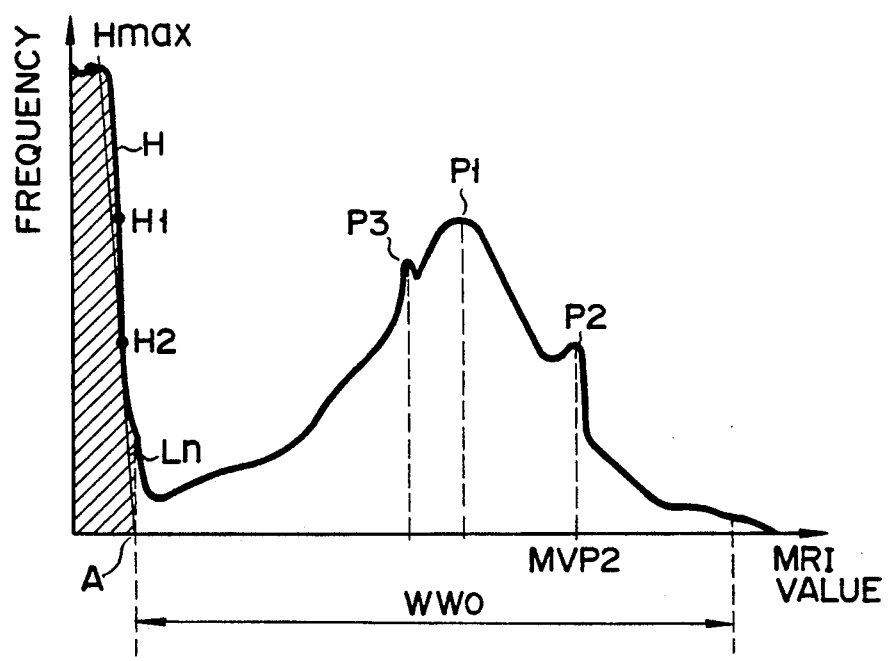
F I G. 18

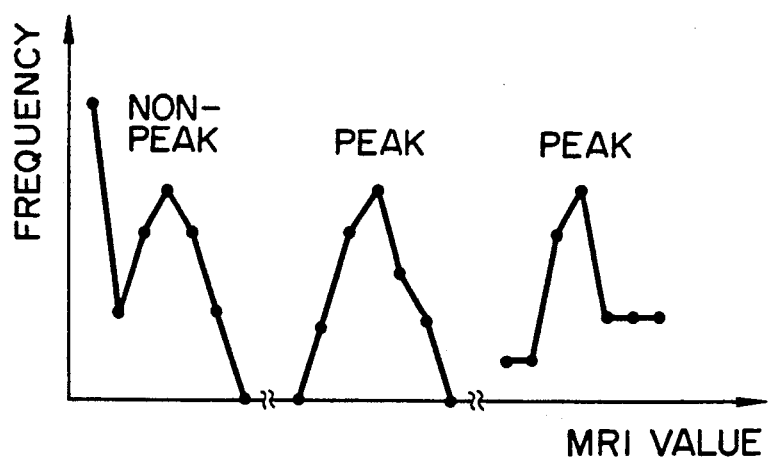
F I G. 19
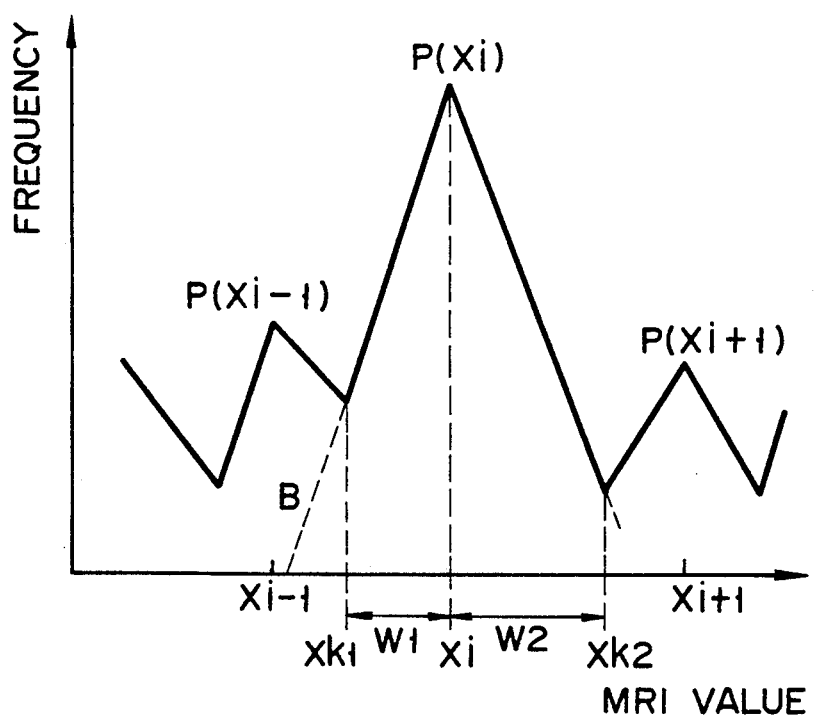
F I G. 20

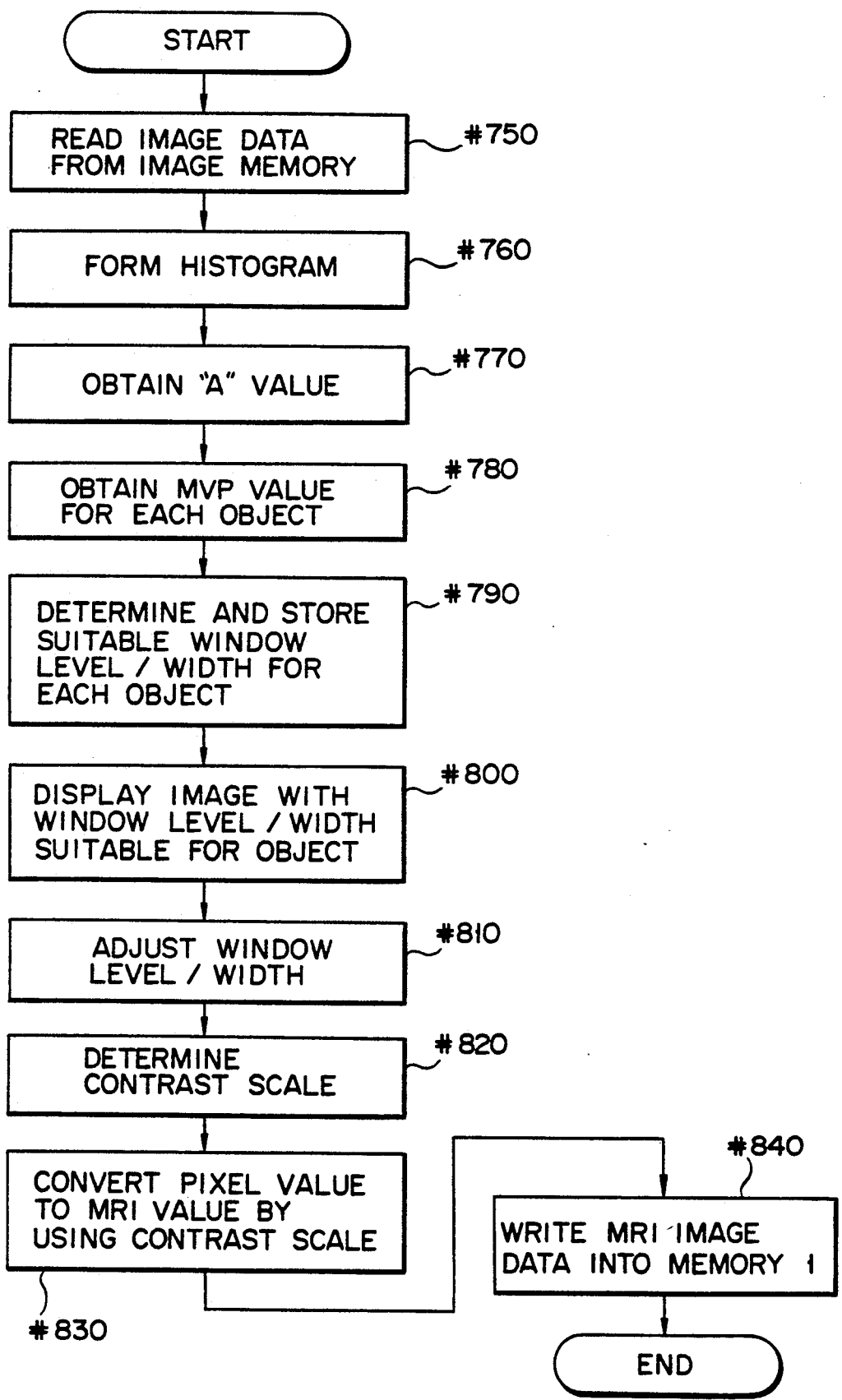
F I G. 25

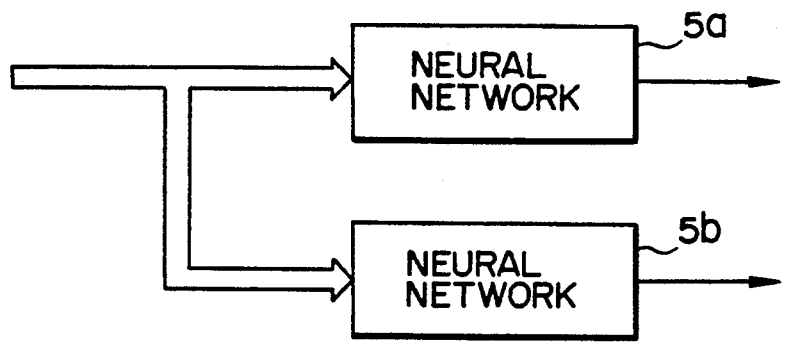
F I G. 26
| NN | γT(NN) |
|---|---|
| 1 | 40 |
| 2 | 20 |
| ⋮ | ⋮ |
F I G. 28

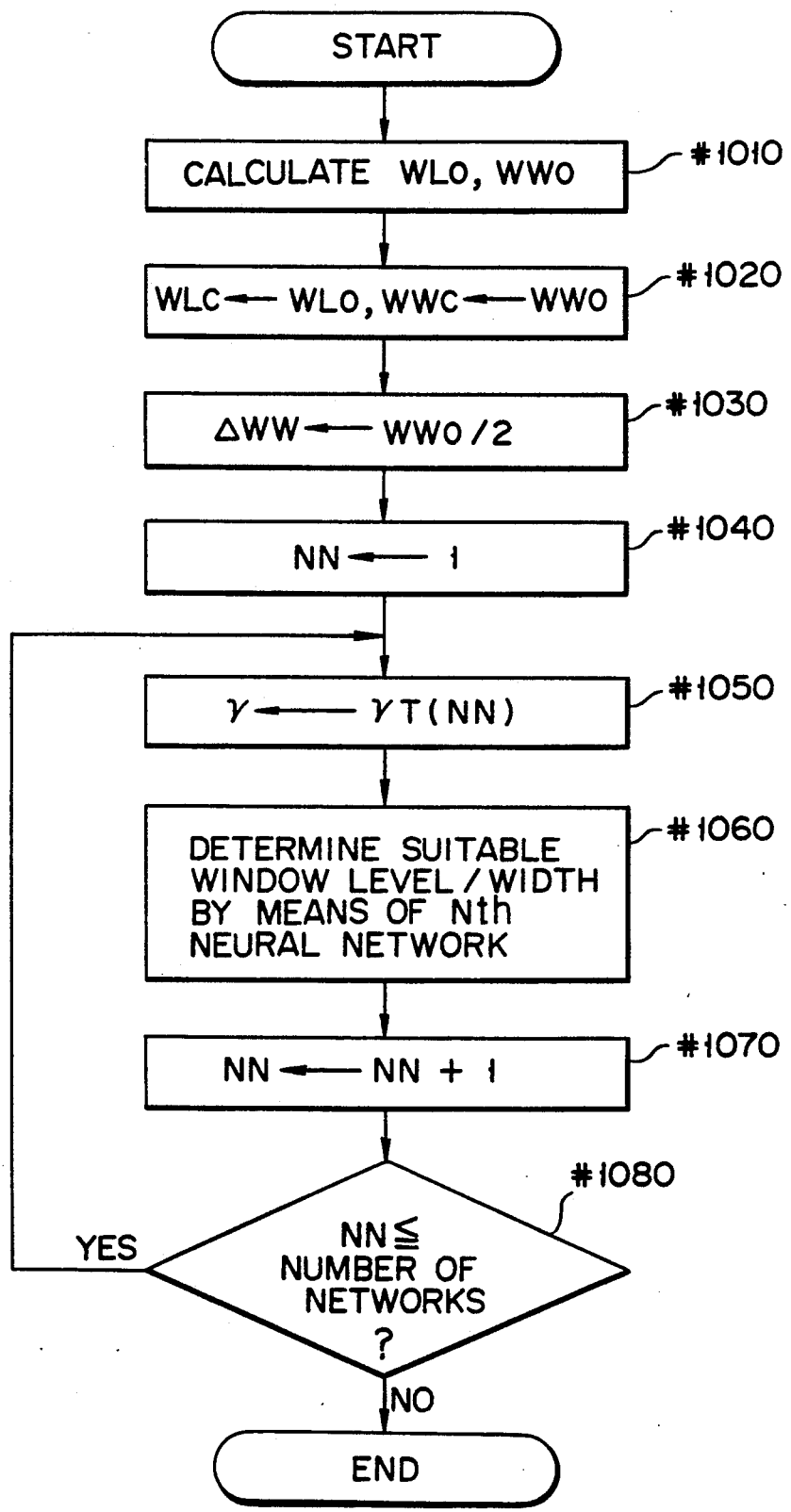
F I G. 27

| WL \ WW | $WLG - \frac{WWG}{4}$ | $WLG - \frac{WWG}{8}$ | WLG | $WLG + \frac{WWG}{8}$ | $WLG + \frac{WWG}{4}$ |
|---|---|---|---|---|---|
| $WWG - \frac{WWG}{4}$ | 0.00 | 0.33 | 0.80 | 0.46 | 0.00 |
| $WWG - \frac{WWG}{8}$ | 0.00 | 0.46 | 0.91 | 0.51 | 0.01 |
| WWG | 0.06 | 0.54 | 1.00 | 0.55 | 0.10 |
| $WWG + \frac{WWG}{8}$ | 0.14 | 0.58 | 0.93 | 0.57 | 0.17 |
| $WWG + \frac{WWG}{4}$ | 0.20 | 0.59 | 0.86 | 0.58 | 0.23 |

F I G. 30

DIGITAL IMAGE DISPLAY APPARATUS WITH AUTOMATIC WINDOW LEVEL AND WINDOW WIDTH ADJUSTMENT

BACKGROUND OF THE INVENTION

1. Field of the Invention

The present invention relates to a digital image display apparatus for displaying an image by converting a pixel value of a digital image data into brightness by means of a display window, which can suitably set a window level and a window width as parameters concerning pixel value-to-brightness conversion, i.e., the display window, in accordance with characteristic features of the digital image data.

2. Description of the Related Art

An example of the image display apparatus of this type is an apparatus for displaying a medical image such as a CT image or an MR image. When the medical image data is to be displayed so as to be observed or photographed on a film as a picture, each pixel value of the image data must be converted into brightness by a predetermined nonlinear conversion function. The conversion function is nonlinear because the dynamic range of the medical image is wider than that of a display screen. If all of the pixel values included in the pixel value range of the digital image data are converted into brightness by using a linear conversion function, no clear image can be displayed. This conversion function is called the display window having the window level and the window width as parameters.

In a conventional system, an operator manually adjusts the window level and the window width while monitoring the image displayed on the screen and sets the display window (conversion function) which allows a necessary portion in the image to be displayed with optimum contrast and brightness This operation becomes cumbersome for the operator if the operator must adjust the window level and width for a number of images In an MRI apparatus or a CT apparatus, therefore, it is attempted to preset standard values of the window level and the window width for each scanning condition and read out the corresponding preset standard values in accordance with the scanning condition of each scan, thereby automatically setting the window level and the window width.

Further, it is proposed to set the display window in accordance with the characteristic features of the image data. An example of such an apparatus is an image display apparatus disclosed in Japanese Patent Disclosure No. 63-84526. This apparatus forms a histogram as shown in FIG. 1A, concerning a pixel value from image data and calculates a threshold level Th from the maximum frequency $H_{max}$, e.g., $0.05 \times H_{max}$, thereby determining a range (Wl to Wh) having a frequency with a level Th or more. The apparatus determines the window width WW (Wl to Wh) and the window level WL ($=(Wh+Wl)/2$) for display of the image, from the lower pixel value limit Wl and the upper pixel value limit Wh as shown in FIG. 1B, thereby forming the conversion function or the display window for pixel value-to-brightness conversion.

This conventional arrangement, however, has the following problem. That is, since the display window is set on the basis of only the threshold level obtained from the maximum frequency in the histogram, it often does not coincide with a display window set by an operator. If the automatically set window is not suitable for observation, the operator must adjust the automatically set window, resulting in a cumbersome operation.

SUMMARY OF THE INVENTION

It is an object of the present invention to provide a digital image display apparatus which can convert a pixel value of a digital image data into brightness by using a suitable conversion function, thereby displaying a clear image.

A digital image display apparatus according to the present invention comprises means for calculating a frequency distribution of pixel values from digital image data, means for calculating a plurality of image qualities from the frequency distribution, indicating clarity of a display image when the digital image data is to be displayed in accordance with a plurality of pixel value-to-brightness conversion modes, and means for selecting one of said plurality of pixel value-to-brightness conversion modes on the basis of said plurality of image qualities.

According to the present invention, the image quality indexing the clarity of the display image is defined, and the display window is determined by using this image quality. Therefore, the display window which realizes a clear image can be easily set.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

FIGS. 1A and 1B are graphs showing a principle of conventional automatic window setting;

FIG. 2 is a block diagram showing a first embodiment of a digital image display apparatus according to the present invention;

FIG. 4 shows a histogram of pixel values formed in the first embodiment;

FIG. 10 is a block diagram showing a second embodiment of a digital image display apparatus according to the present invention;

FIG. 12 is a flow chart showing in detail processing for calculating an optimum display window in the flow chart shown in FIG. 11;

FIG. 13 is a block diagram showing an arrangement of a neural network of the second embodiment;

FIG. 15 is a view showing learning data of the neural network of the second embodiment;

FIG. 16 is a block diagram showing a third embodiment of a digital image display apparatus according to the present invention;

FIG. 18 shows a histogram of pixel values formed in the third embodiment;

FIG. 19 shows a principle of peak detection;

FIG. 20 shows the importance of the peak;

FIG. 25 is a flow chart showing a schematic operation of the fourth embodiment;

FIG. 26 shows a neural network included in a digital image display apparatus of a fifth embodiment according to the present invention;

FIG. 27 is a flow chart showing a schematic operation of the fifth embodiment;

FIG. 28 shows a table of end condition $\gamma T$;

FIG. 30 shows learning data of a second stage neural network of the fifth embodiment;

DETAILED DESCRIPTION OF THE PREFERRED EMBODIMENTS

Embodiments of a digital image display apparatus according to the present invention will be described with reference to the accompanying drawings. FIG. 2 is a block diagram showing an arrangement of a first embodiment of the present invention. Referring to FIG. 2, digital image data of, e.g., an MR image or a CT image is stored in an image memory 1. The image stored in the memory 1 is displayed on a display 4. The display 4 is connected to a window switch 3 for manually setting the window level and the window width and a window controller 2 for receiving the image data from the memory 1 to automatically set the window level and the display window is manually set by the window switch 3 as well as automatically set by the window controller 2 in accordance with characteristics of the image data to be displayed.

Figure 3:
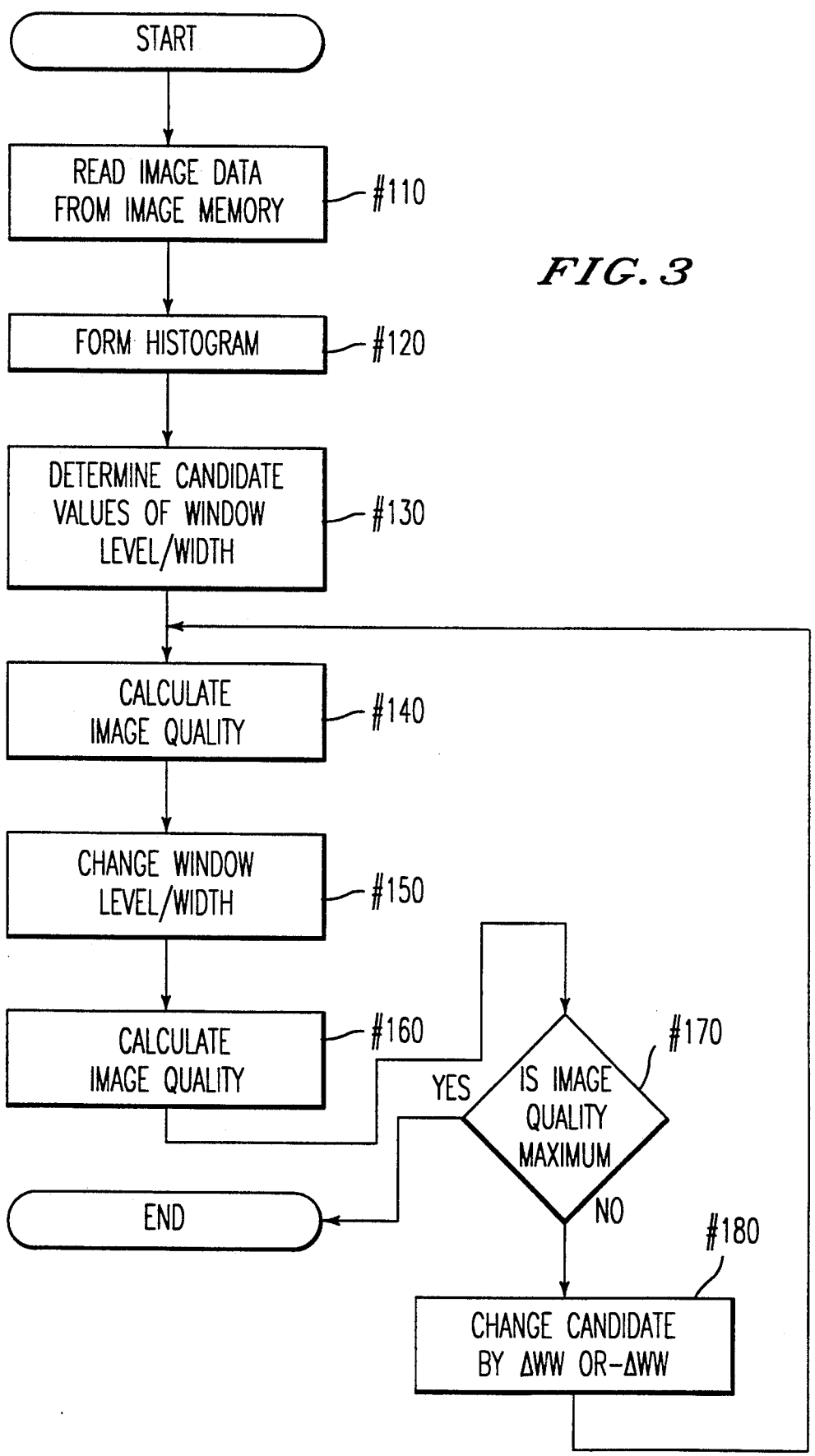
FIG. 3 is a flow chart showing a schematic operation of the first embodiment.

An operation of the first embodiment will be described below. FIG. 3 is a flow chart showing a schematic operation of the window controller 2. In step #110, one frame of the image data is read out from the image memory 1. This image data is supplied to a display 4. The digital image comprises a plurality of pixels each having a pixel value represented by a digital value. Pixel values of the image are converted to brightness values and the image is displayed on the display 4 in accordance with the brightness values. A function used for converting the pixel value to brightness is called the display window comprising the display width and the display level as parameters. Therefore, the same image is displayed in a different brightness and contrast as the display window varies. In step #120, a histogram showing a frequency of pixel values included in the readout image data is formed from the image data. In step #130, candidate values of the window level and the window width are determined. In step #140, image quality which is an index of the clarity of the image displayed on the display 4 is calculated, particularly, the clarity of a specific portion to be observed of the image when the image data is displayed by a given window level and width.

In step #150, one or both of the window level WL and width WW are changed by $\pm \Delta WW$. The amount of change is not limited to this value. In step #160, the image quality to be obtained if the image data is displayed by the changed window level and width is calculated. In step #170, the image quality obtained by the candidate of the display window calculated in step #140 is compared with the image quality obtained based on the display window shifted from the candidate by $\pm \Delta WW$ and calculated in step #160. The candidate values of the window level and width are changed by $\pm \Delta WW$, or the amount of change is reduced, in step #180 in accordance with a difference between these two image qualities. This processing is repeatedly performed while $\Delta WW$ is decreased until the image quality obtained based on the candidate of the display window becomes the maximum. The candidate of the display window corresponding to the maximum image quality is an optimum display window. That is, the optimum display window is determined by a hill climbing method. In this manner, the optimum display window can be automatically calculated in accordance with the overall feature of the histogram of each image. If the image displayed by the display window calculated by the window controller 2 is not clear, an operator may finely adjust the window level and the window width by using the window switch 3.

Each step shown in FIG. 3 will be described in detail below. FIG. 4 shows an example of the histogram formed in step #120, in which an MR image is assumed as the digital image. Here, the pitch of the histogram is set to one pixel value (MRI value). However, the pitch can be freely set, e.g., four MRI values. Since the histogram shown in FIG. 4 is obtained directly from image data and includes a background portion, this background portion is preferably removed from the histogram. In general, in the MR image of a human body, a part of the image corresponding to a portion outside the body has a small and substantially constant MRI value and need not be observed Therefore, an MRI value "A" at a boundary between the background portion H and a portion inside the human body in the histogram is calculated first. For this purpose, a peak frequency $H_{max}$ of the histogram is calculated within a predetermined range from a minimum MRI value. Assuming that the MRI value at the peak $H_{max}$ is h, the peak point is represented by (h, $H_{max}$). The several points, e.g., five points (h+ph, H1), (h+2 × ph, H2), (h+3 × ph, H3), (h+4 × ph, H4), (h+5 × ph, H5) are obtained. Here, ph is a pitch of the histogram. A line Ln connecting these points is calculated by a least squares method. An MRI value at an intersection between the line Ln and an axis of the histogram indicating a frequency of 0 is calculated and defined as the "A" value, and a portion having smaller MRI values than the MRI value "A" is defined as the background H. These processing operations are performed in step #120.

The image quality calculated in step #140 will be described. In this case, image quality Q defined as follows is calculated:

$$Q = \sum_{n=1}^{K} Wn \times Vn \qquad (1)$$

where Vn is an estimation value of an item n (n=1 to k) and Wn is the weighting coefficient of the estimation item n. The weighting coefficient Wn represents an empirically determined correlation ratio of the estimation item n with respect to the image quality Q, such as W1=5, W2=4, W3=3, W4=2, and W5=2. The estimation value Vn is obtained by an estimation function Fn which is defined for each estimation item. It is sometimes difficult to initially define optimum Wn and Fn. In this case, an operator can adjust these values to be optimum while monitoring the image displayed by the display window.

Although the estimation item includes a brightness value, contrast, balance of brightness, and the like, an estimation function F1 concerning a brightness value corresponding to a pixel value MVP will be described below. In this case, V1=F1 (MVP).

Figure 5:
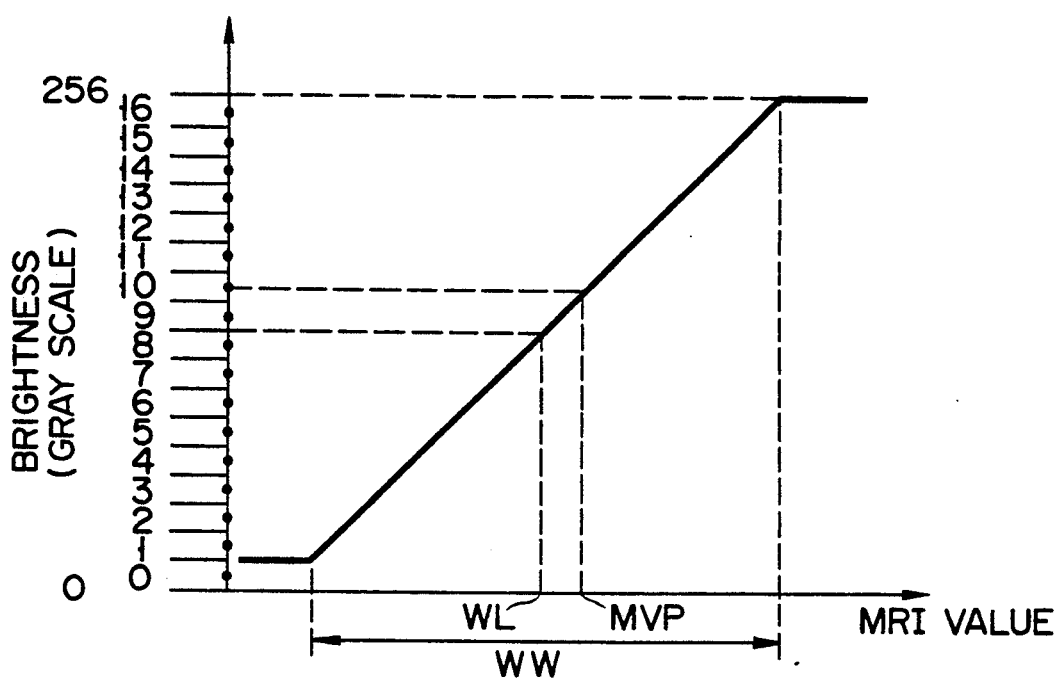
FIG. 5 shows a relationship between the pixel value and brightness of the image displayed by a given display window.

As shown in FIG. 5, each MRI value of image data is converted into brightness which continuously changes within the window width WW. Note that all MRI values below WL−(WW/2) are displayed most darkly, and all MRI values over WL+(WW/2) are displayed most brightly. Referring to FIG. 5, the brightness (256 gradation levels) is expressed as a value which continuously and linearly changes between gray scales 0.5 to 16.5 indicated on the ordinate for the sake of convenience Assuming that the MRI value is X and the gray scale is Y, X and Y for a straight portion within the window width WW are given as follows $$Y = 8.5 + 16 \times (X - WL)/WW \qquad (2)$$

$$X = WL + WW \times (Y - 8.5)/16 \qquad (3)$$

Figure 6:
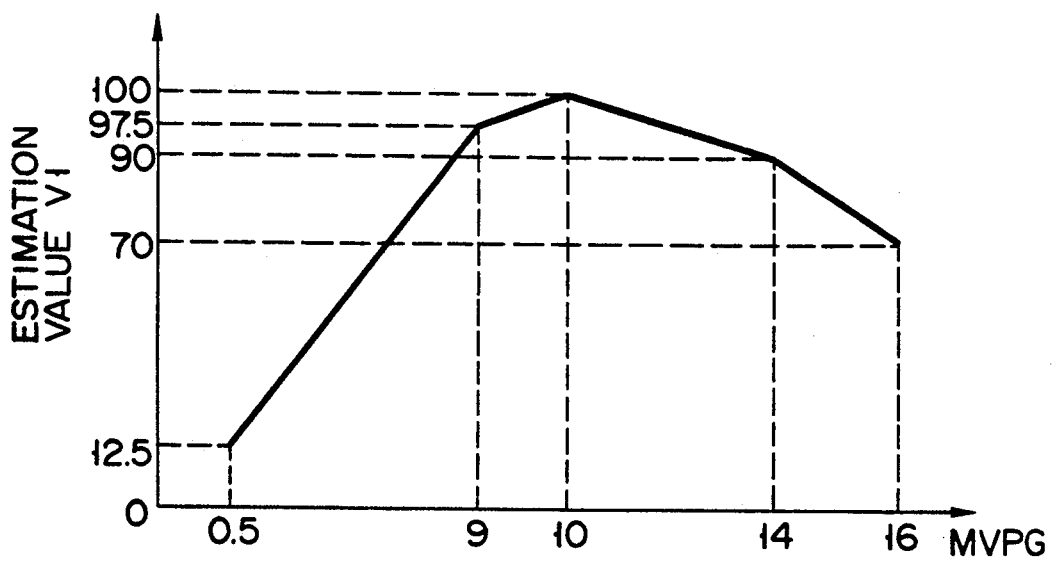
FIG. 6 shows an estimation function concerning a brightness value MVPG corresponding to the pixel value MVP as a first estimation value to be used to calculate an image quality in the first embodiment.

The pixel value MVP is defined as the MRI value of the most desired portion in one frame of the image. That is, the MVP value is the MRI value at a peak P in a portion of the histogram having a value larger than "A" (FIG. 4). This is because it is assumed that the entire image can be clearly seen if the image is displayed such that the MRI value having the highest frequency is clearly seen. In this case, brightness for a clear image is empirically assumed to be slightly higher than the middle brightness Therefore, the estimation function F1 is set such that the estimation value V1 is maximized when the brightness level (gray scale) corresponding to the MVP value is 10 and is decreased as the brightness corresponding to the MVP value has a larger difference from 10. The estimation function is not linearly defined but nonlinearly defined by reflecting the human senses like a membership function used in a Fuzzy theory. FIG. 6 shows an example of the estimation function F1. In FIG. 6, the ordinate indicates a function value V1, and the abscissa indicates brightness value MVPG corresponding to the MVP value.

Other estimation functions are similarly set In this embodiment, a total of five estimation items are set. The second item is the brightness value corresponding to the MRI value "A". Since MRI values smaller than "A" correspond to the background H, they are preferably dark. Therefore, an estimation function F2 is defined such that a function value V2 is maximized when the brightness value corresponding to the MRI value "A" is 0.5 and is decreased as the brightness value corresponding to the MRI value "A" is increased.

The third item is an area of a portion of the image having a brightness value 12. The portion of the brightness value 12 is assumed to be a portion having brightness values of 11.5 to 12.5 in FIG. 5. Therefore, by substituting Y=11.5 to 12.5 in the equation (3), a range of the MRI value $X_{12}$ corresponding to the brightness value 12 in the histogram is represented as follows:

$$X_{12} = (3 \times WW/16) + WL \text{ to } (WW/4) + WL \qquad (4)$$

Therefore, the area corresponding to the brightness value 12 is an area of the histogram having pixel values falling within the range of the equation (4).

The fourth item is an area of a portion having the highest brightness level in an image. In FIG. 5, the highest brightness level is 16.5. Therefore, by substituting Y=16.5 in the equation (3), MRI value $X_{16.5}$ corresponding to the brightness value 16.5 in the histogram is represented as follows:

$$X_{16.5} = (WW/2) + WL \qquad (5)$$

Therefore, the area corresponding to the brightness level 16.5 is the area of the histogram having pixel values larger than the value of the equation (5).

The fifth item is a balance of brightness which is defined as follows:

balance of brightness=(an area having the brightness
value of 4 to 8)/(an area having the brightness
value of 9 to 13)  (6)

Each area of numerator and denominator of the equation (6) can be obtained similarly to the third and fourth items.

Figure 7:
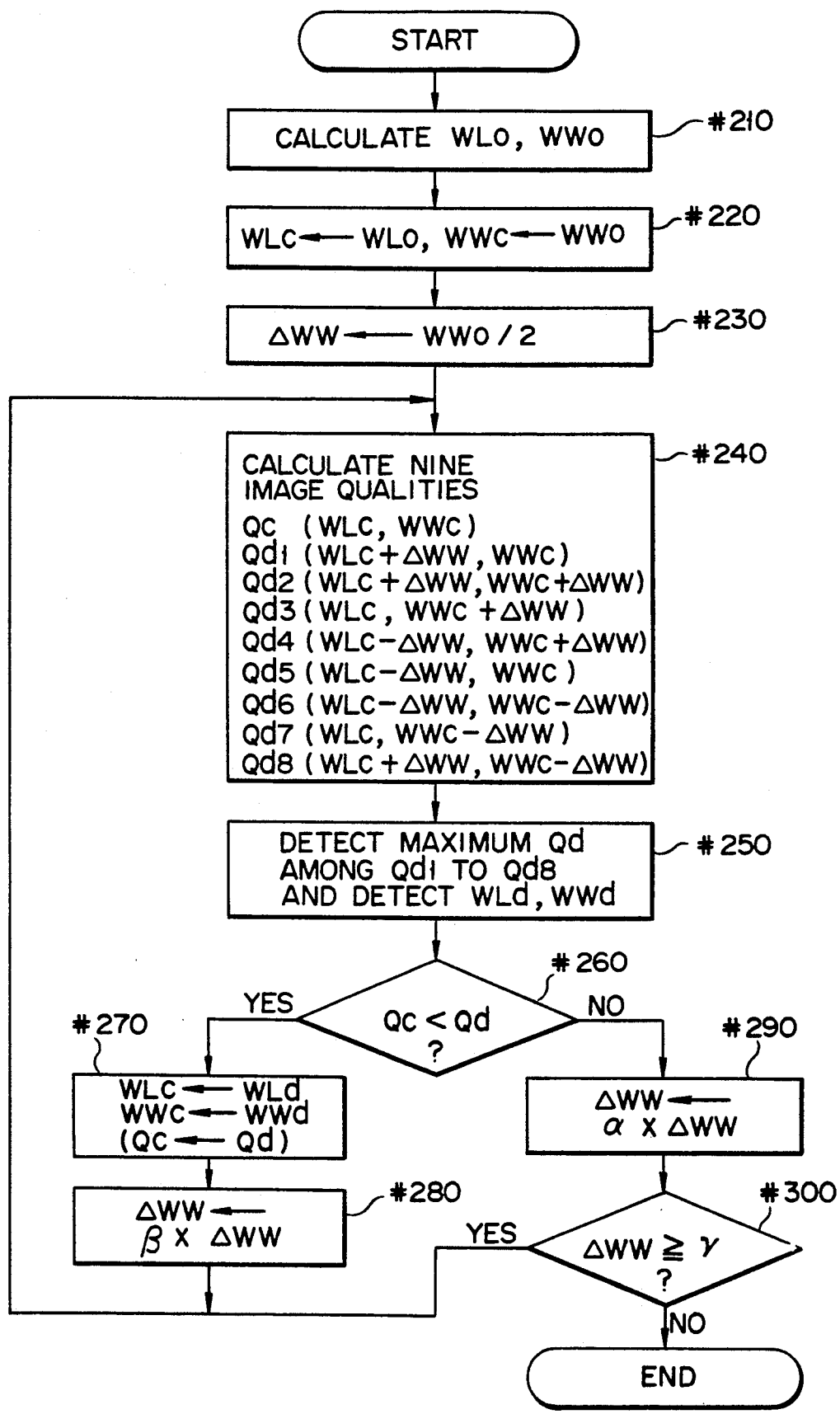
FIG. 7 is a flow chart showing processing for calculating an optimum display window from the image quality by using a hill climbing method in the first embodiment.

Processing in step #170 for determining the optimum display window will be described below. FIG. 7 is a flow chart showing this operation in detail. In step #210, initial values WLo and WWo of the window level and width are calculated. These initial values are first candidates of the window level and the window width. These initial values are set to satisfy WLo=MVP so that the MVP value is located at the center of window width as shown in FIG. 4 and to satisfy WWo=2×(MVP−A) so that the "A" value coincides with the lower limit of the window width, i.e., an entire image except for the background H can be clearly seen. In step #220, the above initial values are set as candidate values WLc and WWc of the window level and width (WLc=WLo, and WWc=WWo). In step #230, WWo/2 is set as an initial value of a change width Δ WW of the display window for a hill climbing method to be described later.

Figure 8:
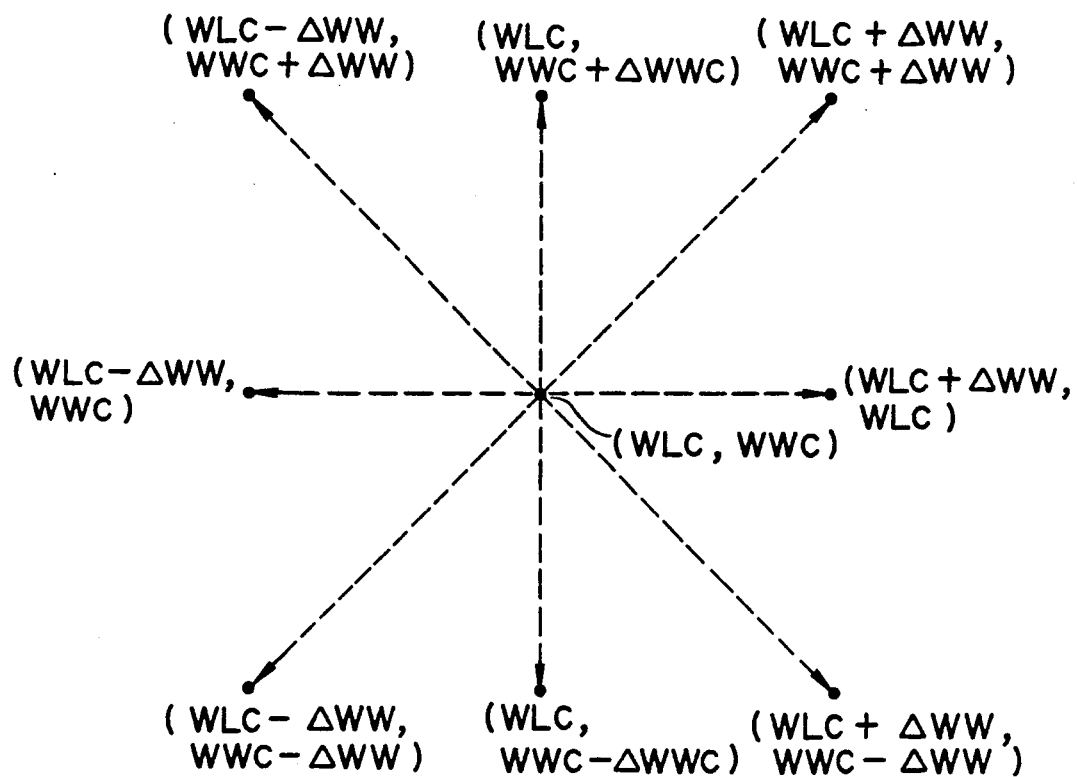
FIG. 8 is a view showing a change of the display window to detect the change of the image quality in accordance with the change of the display window in the flow chart shown in FIG. 7.

In step #240, image quality Qc of an image displayed when the window level and width are set to be WLc and WWc and image qualities Qd1 to Qd8 of images displayed when one or both of the window level and width are changed by Δ WW as shown in FIG. 8 are calculated in accordance with the equation (1). In this case, the image quality Qd1 is obtained by a window level WLc+Δ WW and the window width WWc, the image quality Qd2 is obtained by the window level WLc+Δ WW and a window width WWc+Δ WW, the image quality Qd3 is obtained by the window level WLc and the window width WWc+Δ WW, the image quality Qd4 is obtained by a window level WLc−Δ WW and the window width WWc+Δ WW, the image quality Qd5 is obtained by the window level WLc−Δ WW and the window width WWc, the image quality Qd6 is obtained by the window level WLc−Δ WW and a window width WWc−Δ WW, the image quality Qd7 is obtained by the window level WLc and the window width WWc−Δ WW, and the image quality Qd8 is obtained by the window level WLc+Δ WW and the window width WWc−Δ WW. It is not necessary to make the amount of change of the window level equal to that of the window width. For example, it is possible to obtain Qd1 to Qd8 respectively by (WLc+Δ WW, WWc), (WLc+Δ WW/2, WWc+Δ WW), (WLc, WWc+2×ΔWW), (WLc−ΔWW/2, WWc+ΔWW), (WLc−ΔWW, WWc), (WLc−Δ WW/2, WWc−Δ WW), (WLc, WWc-2×Δ WW), (WLc+Δ WW/2, WWc−Δ WW).

Figure 9:
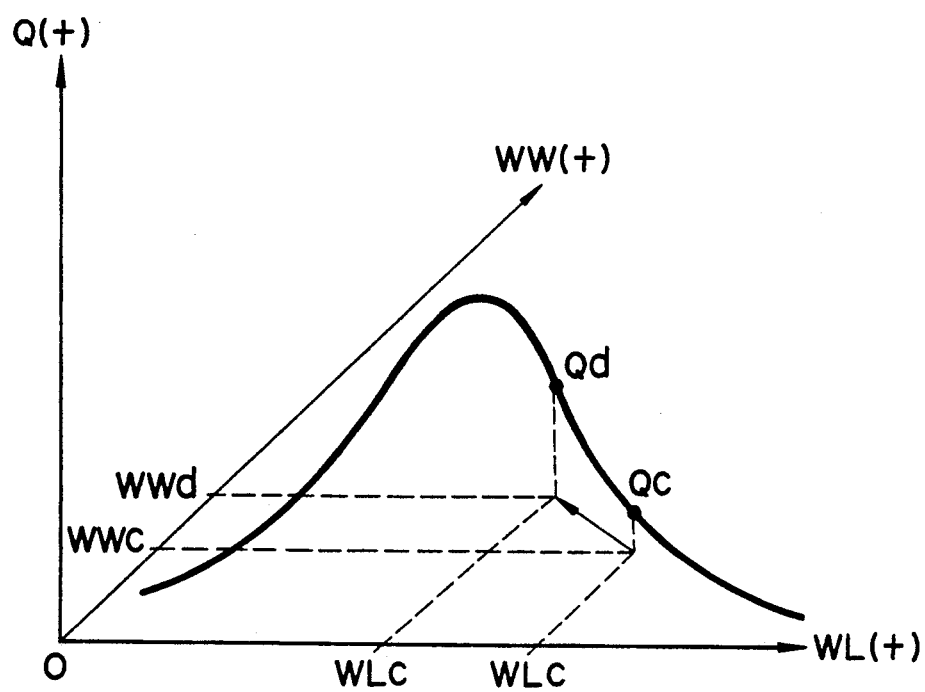
FIG. 9 is a graph showing the principle of the hill climbing method.

In step #250, maximum image quality Qd among the image qualities Qd1 to Qd8 is detected, and the window level WL and the window width WW corresponding to the detected image quality Qd are detected as WLd and WWd, respectively. In step #260, the image quality Qc of the candidate values of the display window is compared with the image quality Qd of the display window slightly shifted from the candidate values to check whether Qc is smaller than Qd. If yes in step #260, the values of the display window corresponding to the image quality Qd are more suitable than the candidate values of the display window. Therefore, WLc=WLd, WWc=WWd, and Qc=Qd are set in step #270. That is, this corresponds to an event in which the candidate values of the window level and width are changed to the values corresponding to the image quality Qd as shown in FIG. 9. The amount of change Δ WW is multiplied by β in step #280, and the flow returns to step #240. In this case, β is a constant which satisfies $1 < \beta$, i.e., the amount of change is increased.

If no in step #260, it is determined that the candidate values are suitable. Therefore, in order to decrease the amount of change to repeat the above judgment, the amount of change Δ WW is multiplied by α in step #290. In this case, α is a constant which satisfies $0 < \alpha < 1$ and $0 < \alpha \times \beta < 1$. In step #300, whether $\Delta WW \geq \gamma$ is checked In this case, γ is a constant for determining an end of processing. If yes in step #300, the flow returns to step #240 to calculate image quality based on the candidate values and image qualities based on the eight windows around the candidate shown in FIG. 8. If no in step #300, the current candidate values WLc and WWc are determined as finally obtained suitable window level and width WL and WW, and the processing is ended.

According to the first embodiment as described above, an index indicating the clarity of the display image which satisfies the human senses is defined as the image quality according to the various estimation items obtained from the histogram of the pixel values of the image data, and the image quality obtained based on the candidate of the display window is compared with the image quality obtained based on the window level and a window width slightly shifted from the candidate values. In accordance with the comparison result, this comparison is performed while the candidate values are shifted and the amount of shift is gradually reduced, thereby determining an optimum display window by a so-called hill climbing method using the image quality. Therefore, an optimum display window can be easily obtained for each image. As a result, a load on an operator can be reduced.

Although the estimation function and the weighting coefficient are manually adjusted and set in the above embodiment, these values may be automatically set. For example, the weighting coefficient Wn can be set as follows. Assume that the number of items is 5 and Wn is an integer from 1 to 5. In this case, 3,125 ($=5^5$) combinations can be made for W1 to W5. A plurality of, e.g., 10 standard images are displayed, and the window level and the window width set by a skilled operator (a radiographer when the image is an MR image) are stored for each image. Display windows corresponding to the 3,125 combinations of W1 to W5 are compared with the display window set by the skilled operator, and the values corresponding to the closest display window are set as W1 to W5. Similarly, an optimum value of Fn can be determined such that a difference with respect to the display window set by the skilled operator is minimized. The above processing can be realized by not only a computer with a normal procedure-oriented program but also performed as an expert system by using rules Since the clarity of image largely depends on the human senses, the expert system is more preferred.

A second embodiment of the present invention will be described below. FIG. 10 is a block diagram showing the second embodiment. The second embodiment is the same as the first embodiment shown in FIG. 2 except that a neural network 5 is connected to a window controller 2. In the first embodiment, the image quality is defined as a function and obtained by an arithmetic operation. In the second embodiment, however, the image quality is obtained by the neural network 5.

Figure 11:
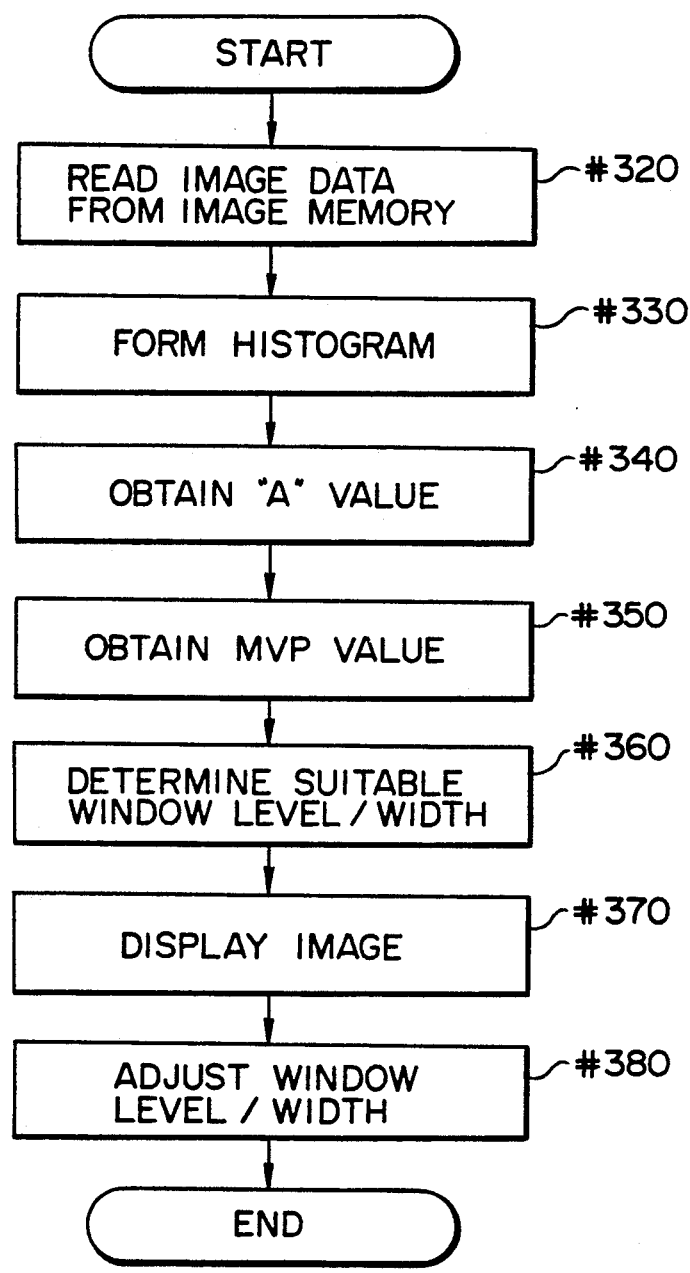
FIG. 11 is a flow chart showing a schematic operation of the second embodiment.

FIG. 11 shows a schematic operation of the second embodiment. In step #320, one frame of image data is read out from the image memory 1. In step #330, a histogram indicating a frequency of pixel values is formed from the image data. This histogram is similar to that of the first embodiment shown in FIG. 4. In step #340, the "A" value is obtained as in the first embodiment. In step #350, the MVP value is obtained as in the first embodiment. In step #360, the window level and the window width suitable for the image (e.g., the "A" value and the MVP value) are determined. This processing will be described in detail later. In step #370, the image data is displayed by the determined window level and width. In step #380, an operator observes the displayed image and finely adjusts the window level and width by using the window switch 3, if necessary.

Each step in FIG. 11 will be described in detail below. FIG. 12 shows determination of the suitable display window in step #360 in detail. Similar to the first embodiment, the hill climbing method is adopted as a display window determination method. Unlike in the first embodiment, however, the image quality with regards to the display window is calculated not by an arithmetic operation but obtained by the neural network 5. That is, in step #410, candidate values of the window level and the window width are determined. In step #420, the image quality of the image data displayed by the determined window level and width is obtained by means of the neural network 5. In step #430, one or both of the window level and width are changed by Δ WW. In step #440, the image quality of the image data displayed by the changed window level and width is obtained. In step #450, the image qualities obtained in steps #420 and #440 are compared with each other, and the candidate values of the window level and width are changed in accordance with a difference between the two image qualities. In addition, optimum values of the window level and width are determined while Δ WW is gradually decreased, i.e., by the hill climbing method. The processing of determining the optimum display window by the hill climbing method is the same as the processing in the first embodiment shown in FIG. 7.

As described above, although the image quality is calculated by a function such as a membership function used in a Fuzzy theory in the first embodiment, it is obtained by using the neural network in the second embodiment. Therefore, the image quality suitable for characteristics of individual equipment or hospital can easily be obtained. As a result, by causing a neural network to learn in accordance with individual equipment, the display window optimum for the individual equipment can be set. Referring to FIG. 10, in order to obtain the image quality, the window controller 2 transfers estimation items (similar to those in the first embodiment) for calculating the image quality to the neural network 5. The neural network 5 produces the image quality on the basis of the estimation items and transfers the produced image quality to the window controller 2. As a result, the window controller 2 obtains the image quality.

Figure 14:
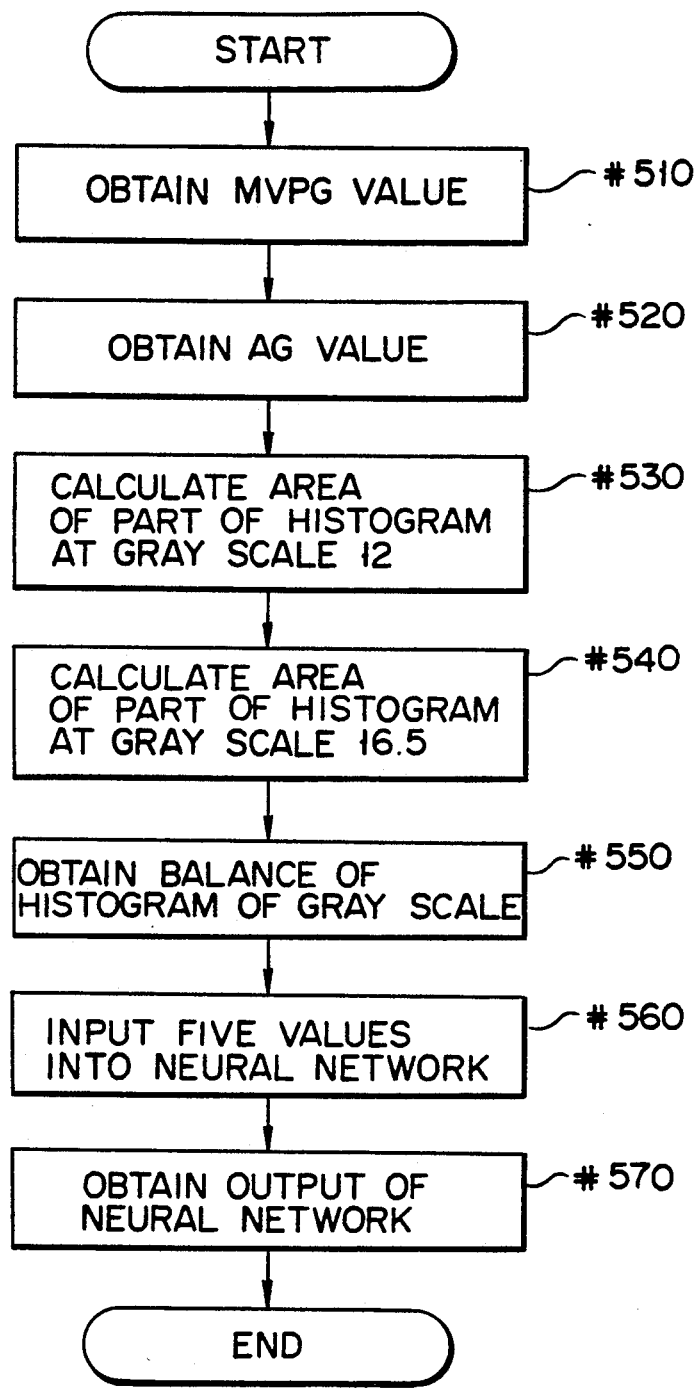
FIG. 14 is a flow chart showing in detail processing for calculating the image quality in the flow chart shown in FIG. 12.

The neural network 5 will be described below. FIG. 13 shows an arrangement of the neural network 5. The network 5 is constituted by three layers of an input layer 7, an intermediate layer 8, and an output layer 9. The intermediate layer 8 may consist of a plurality of layers. The input layer 7 includes five units 7a to 7e. The five estimation item data as described in the first embodiment are input to the neural network 5. That is, the brightness value MVPG, the brightness value AG, the area of brightness value 12, the area of the maximum brightness, and the balance of brightness are respectively input to the units 7a to 7e. The number of input items is not limited to five. If the number of input items is increased or decreased, the number of units in the input layer 7 may be increased or decreased accordingly. A method of obtaining the input data will be described in detail later. In this embodiment, the intermediate layer 8 consists of 50 units and constitutes the network together with the units 7a to 7e in the input layer 7 and the output layer 9. The output layer 9 is constituted by one unit and outputs image quality having a value of 0 to 1. An input/output relationship of the unit included in the neural network 5 is represented by the following sigmoid function f(x):

$$f(x) = 1/\{1 + \exp^{(-x+b)}\} \quad (7)$$

where b is the bias which is a weight of a bias element (having an output of "1") and is determined by learning and x is the input. The neural network 5 must be made to learn beforehand. This learning will be described in detail later. In this case, assume that the neural network 5 has finished its learning FIG. 14 is a flow chart showing a sequence of obtaining the image quality by means of the neural network 5 in steps #420 and #440. Referring to FIG. 14, in step #510, the brightness value MVPG corresponding to the MVP value of the image displayed by a given display window is obtained. The brightness value MVPG is represented as follows by substituting MVP for X and MVPG for Y in the equation (3):

$$MVPG = 8.5 + 16 \times (MVP - WL)/WW \quad (8)$$

Since an input to the neural network 5 must have a value of 0 to 1, the brightness value MVPG calculated by using the equation (8) is multiplied by a normalized coefficient of 1/16.5 to obtain a normalized MVPG In step #520, the brightness value AG corresponding to the MRI value "A" of the image displayed by the given window is obtained. The brightness value AG is represented as follows in accordance with the equation (3) similar to the brightness value MVPG:

$$AG = 8.5 + 16 \times (A - WL)/WW \quad (9)$$

Also in this case, AG is calculated by using the equation (9) and multiplied by the normalized coefficient of 1/16.5 to obtain a normalized AG.

In step #530, the area of a portion of the image having brightness value at gray scale 12, displayed by the given window is calculated. More specifically, the area of a part of the histogram at gray scale 12 is calculated in accordance with the equation (4) and the result is multiplied by a normalized coefficient of 1/100. However, if the normalized value exceeds 1, the value is considered as 1.

In step #540, the area of a portion having highest brightness value, i.e., at gray scale 16.5 of the image displayed by the given window is calculated. More specifically, the area of a part of the histogram is calculated in accordance with the equation (5) and multiplied by a normalized coefficient of 1/30. If the normalized value exceeds 1, the value is considered as 1.

In step #550, the balance of brightness, i.e., (the area having brightness values of 4 to 8)/(the area having brightness values of 9 to 13) as defined in the equation (6) of the image displayed by the given window is obtained. These areas are obtained similar to steps #530 and #540. In this case, a normalized coefficient is 1/6. If the normalized value exceeds 1, the value is considered as 1.

In step #560, the five values obtained in steps #510 to #550 are transferred to the neural network 5 and input in the units 7a to 7e in the input layer 7. In step #570, the image quality is obtained from the output layer 9 of the neural network 5.

Learning of the neural network 5 will be described below. As described above, the neural network 5 must learn beforehand in order to output the image quality suitable for the input estimation item data. Although a learning method is not limited to that of this embodiment, a back propagation method is used in this embodiment. That is, a predetermined number of learning data are repeatedly input to the neural network 5 to perform learning by the back propagation method, and the learning is repeated until the error is reduced below a predetermined value. In this embodiment, the learning is performed by using the following learning data. However, learning data formation method is not limited to that of this embodiment.

The learning data are formed on the basis of a plurality of actual image data and window levels and window widths set by a skilled operator in order to display those image data. One image is selected, and a window level WLG and a window width WWG are set for the image by the skilled operator. A total of 25 combinations of (WLS, WWS) are sampled as display windows for learning by using a window level WLS of WLG−WWG/2, WLG−WWG/4, WLG, WLG+WWG/4, and WLG+WWG/2 and a window width WWS of WWG−WWG/2, WWG−WWG/4, WWG, WWG+WWG/4, and WWG+WWG/2. Five estimation item data of the brightness MVPG, the brightness AG, the area of brightness at gray scale 12, the area of brightness at gray scale 16.5, and the balance of brightness are calculated for each of the 25 combinations of (WLS, WWS) in steps #510 to #550 and used as input data for learning. Teacher data for these combinations of (WLS, WWS) is defined as shown in FIG. 15 to form 25 sets of learning data. Subsequently, 25 sets of learning data are formed for each of an arbitrary number of images, and learning is repeatedly performed by using all the learning data until the value of errors is reduced below a predetermined value.

According to the second embodiment as described above, since the neural network 5 can perform learning, a display window suitable for characteristics of individual equipment or hospital can be automatically set without performing cumbersome operations, i.e., determining an estimation function and a weighting coefficient as in the first embodiment In addition, since the image can be displayed by the suitable display window, an operation of setting the display window to be performed to display the image is simplified to reduce a load on the operator.

A third embodiment of the present invention will be described below. In the first and second embodiments, one optimum display window is determined for each image. However, an optimum display window changes even for one image in accordance with an object (a portion or the type of tumor) to be observed, a purpose, or the like. In the third embodiment, therefore, a suitable display window is obtained for each observation object in one image, and the image is displayed by different display windows for different objects. FIG. 16 is a block diagram showing the third embodiment. An arrangement of the third embodiment is the same as that of the second embodiment except that a selection switch 10 for selecting the object to be observed is connected to a window controller 2.

Figure 17:
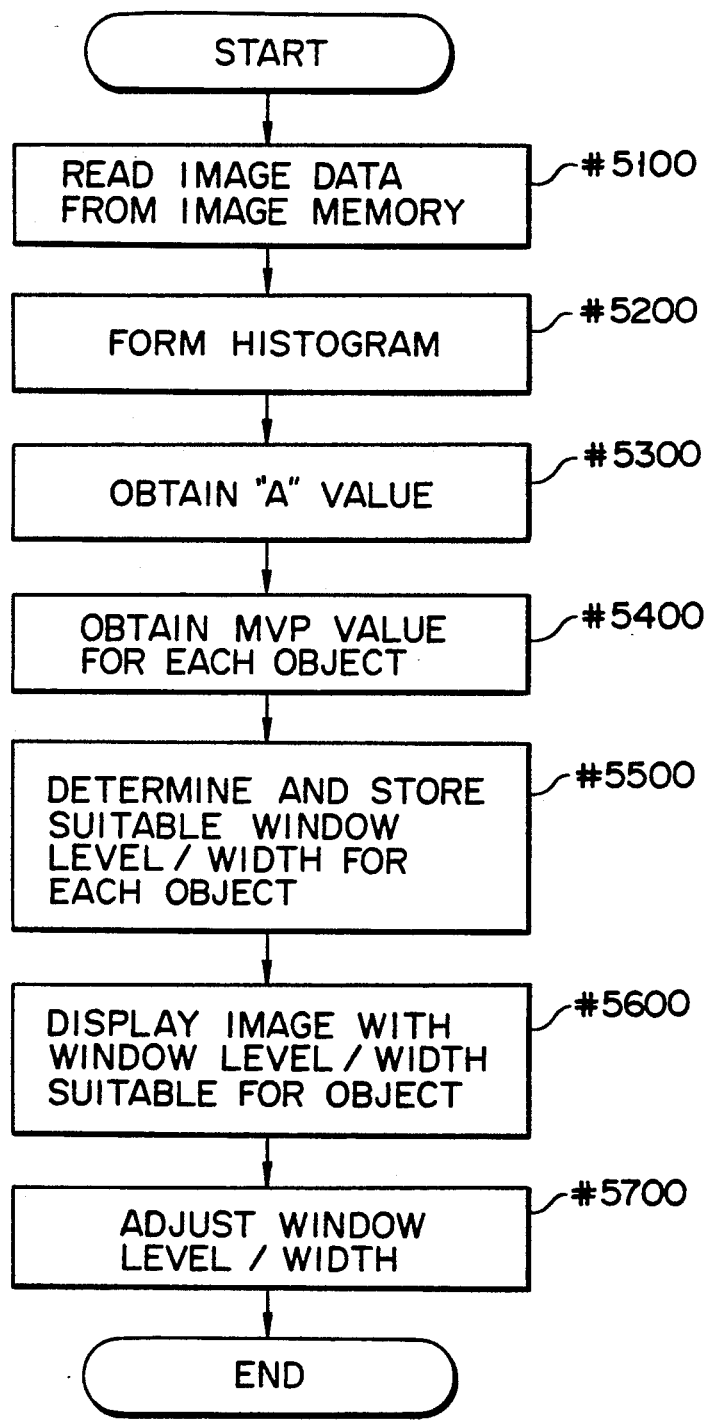
FIG. 17 is a flow chart showing a schematic operation of the third embodiment.

FIG. 17 shows a schematic operation of the third embodiment. Referring to FIG. 17, in step #5100, one image data is read out from the image memory 1. In step #5200, a histogram indicating a frequency of pixel values is formed on the basis of the image data. This histogram has a plurality of peaks P1, P2, and P3 as shown in FIG. 18. In step #5300, the value "A" is obtained as in the first embodiment In step #5400, the MVP value is obtained for each object As described above, the MVP value is an MRI value of a portion assumed to be desired most by an operator to observe However, since the number of portions to be observed is not limited to one in one image, the MVP value is calculated for each object Assume that MVPn are obtained by arranging MVPn in the order of importance MVPn are MRI values of a portion assumed to be desired most by an operator to see with respect to an n-th object. The observation object differs between a case in which an entire image is to be observed and a case in which a specific object (e.g., a portion or tumor) is to be observed. In order to observe the entire image, it is assumed that the entire image can be clearly seen when the image is displayed such that an MRI value having the highest frequency in the image except for the background is clearly seen. In order to observe the specific object (e.g., a portion or tumor), it is assumed that a peak of a partial histogram corresponds to a portion desired most to be observed. Therefore, in the case shown in FIG. 18, MVP1, MVP2, and MVP3 are MRI values of portions assumed to be desired most to be observed for the respective objects. In this case, the number of observation objects m is 3. More specifically, the MRI values MVPn are calculated by searching the peaks of the histogram which are located in the range over the MRI value "A". As shown in FIG. 19, the peak is defined as a point having a frequency higher than those of several points at both sides of the point. As shown in FIG. 20, the importance of the peak is evaluated in consideration of, e.g., (1) a distance xi between peaks, (2) the height of the peak, and (3) the width W1, W2 of the peak. In this embodiment, MVP1, MVP2, and MVP3 are important in the order named. The observation objects (the number of MVP) are simultaneously stored.

In step #5500, suitable window level and width are determined for each observation object (each MVPn value). This determination processing will be described in detail later. In step #5600, image data is displayed for each object by using the window level and width determined for each object in step #5600. In step #5700, an operator monitors the displayed image and finely adjusts the window level and width by using the window switch 3, if necessary.

According to the third embodiment as described above, since a display window suitable for the observation object can be easily set when the image is displayed, a load on the operator can be reduced.

Figure 21:
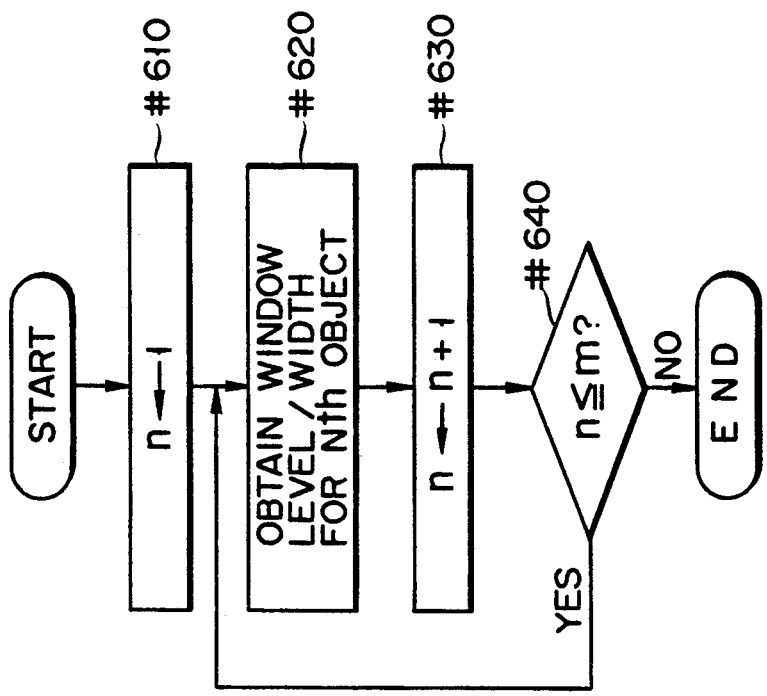
FIG. 21 is a flow chart showing processing for determining a display window of the third embodiment.

Each step will be described in detail below. The sequence of determining the display window suitable for each object in step #5500 will be described with reference to FIG. 21. In step #610, a parameter n for denoting the object is set to be 1. In step #620, the display window suitable for an n-th object is obtained This display window can be obtained by the same method as that of the second embodiment shown in FIG. 14. In this case, the estimation items and the weighting coefficient of the network are selected in accordance with the object (the type of MVP). The image quality can be obtained not by the neural network but calculated by a function as in the first embodiment In this case, the estimation items, the weighting coefficient, and the estimation function for calculating the image quality are selected in accordance with the object (the type of MVP). For example, W1 to W5 are set to be 5, 4, 3, 2, and 2 with respect to an object 1, and set to be 6, 4, 3, 2, and 1 with respect to an object 2. Note that the second estimation item for the object 1 is brightness of the "A" value, but that for the object 2 is brightness of a "B" value as shown in FIG. 20. The "B" value indicates a pixel value of an intersection of the X axis and a line connecting a point located between a certain peak and an adjacent peak at the left side of the certain peak and having a lowest histogram level and the certain peak. In this manner, the estimation function is selected in accordance with the object. The obtained window level and width are stored in a window memory included in the controller 2. In step #630, the parameter n is incremented. In step #640, the parameter n is compared with the number of objects m. If n≦m, i.e.. objects whose display window must be determined remain steps #620 and #630 are repeated. If n>m, i.e., the display windows are obtained for all the objects, the processing is ended.

Figure 22:
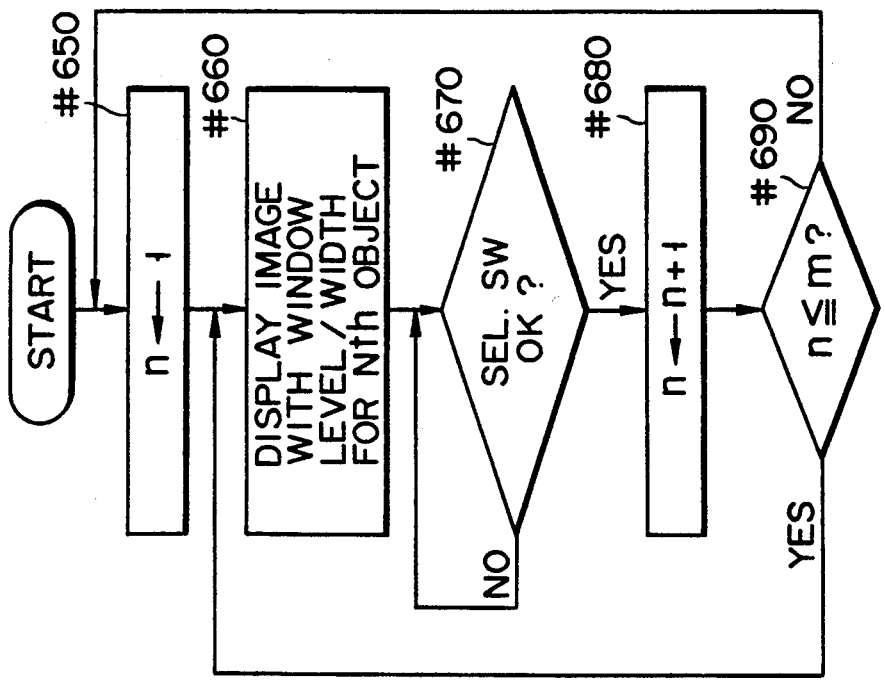
FIG. 22 is a flow chart showing display of image data of the third embodiment.

FIG. 22 shows the sequence of selecting a display window suitable for the object and displaying the image shown in step #5600. In step #650, the parameter n is set to be 1. In step #660, the window level and the window width corresponding to the n-th object are read out from the window memory in the controller 2 and transferred to the display 4. As a result, the image is displayed so that the n-th object is most clearly seen. If the selection switch 10 is depressed in step #670, the parameter n is incremented in step #680. In step #690, the incremented n is compared with the number of objects m stored beforehand. If n is equal to or smaller than m, the flow returns to step #660, and the image is displayed by the n-th display window. If n reaches m, the flow returns to step #650, and n is reset to be 1. That is, the display window for the first object is set again when the selection switch 10 is depressed after the display window for the mth object is set. The display windows for the respective objects are sequentially set each time the switch 10 is depressed during display of the image. Therefore, the operator can display the image by the display window suitable for the object by a simple operation.

Figure 23:
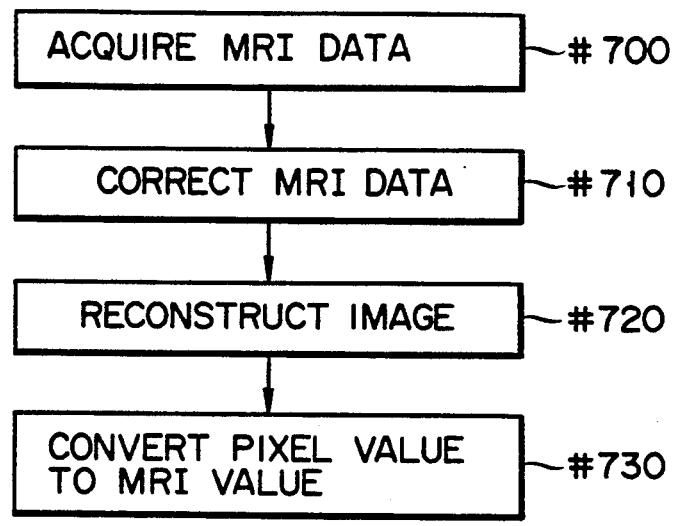
FIG. 23 is a flow chart showing a principle of a fourth embodiment of a digital image display apparatus according to the present invention.

According to the third embodiment as described above, the optimum display window can be easily set for each observation object in one image A fourth embodiment of the present invention will be described below. FIG. 23 is a schematic view showing a sequence of image formation in the MRI apparatus In step #700, MR raw image data is acquired The acquired data is corrected in step #710, and the corrected image data is reconstructed to an image by, e.g., a two-dimensional Fourier Transform in step #720. In step #730, a pixel value of the reconstructed image data is converted to an MRI value by a contrast scale, i.e., the reconstructed image is converted to an MR image. The reconstructed image is a digital image formed by the pixels each having the pixel value and has the same matrix size as that of the MR image. The pixel value of the reconstructed image varies within a large range depending on the object and the scanning condition. The MR image is thus formed by the MRI values within the range of −1000 to 2000 (or 4000) which are obtained by converting the pixel values of the reconstructed image by means of the contrast scale.

The contrast scale is generated represented as follows:

$$Y = pX + q \tag{10}$$

where Y is the MRI value, X is the pixel value of the reconstructed image, and p and q are the constants. In this embodiment, the constants p and q of the contrast scale are determined in accordance with the reconstructed image so that the MRI value is standardized. A block diagram of the fourth embodiment is the same as that of the third embodiment and therefore is not shown.

A schematic operation of the fourth embodiment will be described below with reference to FIG. 25. In step #750, one reconstructed image data is read out from the image memory 1. In step #760, a histogram indicating a frequency of pixel values is formed on the basis of the reconstructed image data. As shown in FIG. 18, this histogram has a plurality of peaks P1, P2, and P3. The "A" value is obtained in step #770, and the MVP value is obtained for each object in step #780. In step #790, suitable window level and width are determined for each object (each MVPn value). In step #800, the reconstructed image data is displayed for each object by the determined window level and width suitable for the object. In step #810, an operator monitors the displayed image and finely adjusts the window level and width by using the window switch 3, if necessary. The processing so far is exactly the same as that from steps #5100 to #5700 of the third embodiment shown in FIG. 17.

Figure 24:
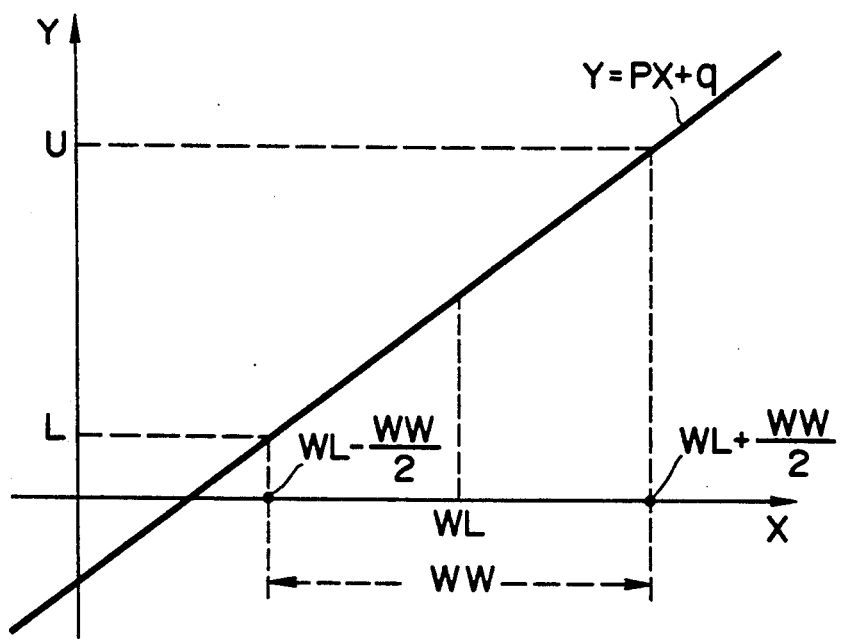
FIG. 24 shows a contrast scale.

In step #820, as shown in FIG. 24, the constants p and q of the contrast scale (pixel value-to-MRI value conversion function) are determined on the basis of the window level WL and the window width WW so that the upper limit WL+(WW/2) of the display window width is converted into an MRI value U and the lower limit WL−(WW/2) of the window width is converted into an MRI value L. That is, by substituting U=WL+(WW/2) and L=WL−(WW/2) into equation (10), p and q are calculated as follows:

$$p = (U-L)/WW \tag{11}$$

$$q = \{(U+L)/2\} - \{WL(U-L)/WW\} \tag{12}$$

In step #830 by using the calculated constants p and q of the contrast scale (conversion function), the pixel value of the reconstructed image is converted to the MRI value by equation (10) to obtain the MR image. In this case, most MRI values of an effective portion (to be observed) of the MR image are included between the upper limit WL+(WW/2) of the display window and its lower limit WL−(WW/2). Therefore, by converting the pixel value of the reconstructed image to the MRI value by the contrast scale, the MR image in which the dynamic range of the MRI value of a portion to be observed is between U and L is obtained, and the MRI value is standardized to the range of values to be observed. Since the MRI value has no absolute meaning, it can be standardized in this manner. In order not to narrow the dynamic range of the MR image, the range between U and L is preferably set as wide as possible.

In step #840, the MR image is stored in the image memory 1. In order to display the stored MR image with a brightness suitable for observation, the window level WL is set to (U+L)/2 and the window width WW is set to U−L. As a result, the same display window can be set for all the image and it is not necessary to respectively set the display windows for all images. That is, since the MRI values are standardized, it is sufficient to set the display window once. The window setting operation to be performed to display the image is simplified to reduce a load on the operator. Further, according to the present embodiment, it is also easy to set the display window in order to determined the constants of the contrast scale.

Though in the fourth embodiment the display windows are set for the respective objects, one display window can be set for one image without regard to the objects in the image as in the second embodiment. Further, the fourth embodiment can calculate the image quality by using the estimation function as in the first embodiment.

A fifth embodiment of the present invention will be described below. This embodiment relates to an improvement in the neural network. In the above embodiments, one neural network for obtaining the image quality is used. However, sufficient precision cannot be obtained by using one neural network. In the fifth embodiment, therefore, a plurality of neural networks are sequentially used to obtain sufficient precision.

A block diagram of the fifth embodiment is the same as that of the second embodiment shown in FIG. 10 and therefore is not shown. As shown in FIG. 26, the neural network 5 is constituted by a network of two stage including a first neural network 5a and a second neural network 5b, and each estimation item data is input to the networks 5a and 5b. The two networks have different precision levels in calculated image quality.

An operation of the fifth embodiment will be described below. A schematic operation is the same as that of the second embodiment shown in FIG. 11. FIG. 27 is a flow chart showing processing of determining an optimum display window by using the neural network. In step #1010, initial values WLo and WWo of the window level and the window width are calculated. Similar to the above embodiments, the initial values are WLo=MVP and WWo=2×(MVP−A). In step #1020, the initial values are set as the candidates of the display window, i.e., WLc=WLo and WWc=WWo. In step #1030, WWo/2 is set as an initial value of the amount of change Δ WW of the display window. In step #1040, 1 is set in a parameter NN indicating the stage of the network. In step #1050, an end condition value γ T(NN) of an NNth stage neural network is extracted from a table and set to be γ. FIG. 28 shows the table. In this embodiment, searching of the optimum display window is performed by sequentially decreasing the amount of change. When the amount of change is decreased to be a predetermined value or less, searching of the optimum display window is finished. Therefore, the end condition value of the first stage neural network is largest, and the other end condition values are smaller in descending order.

In step #1060, the image quality is calculated by using the NNth stage neural network, and the optimum window level and width for displaying the image are calculated according to the image quality. In this case, the initial values of the display window candidate used in processing performed by the first stage neural network are set in step #1020 shown in FIG. 27, and the initial values of the display window candidate used in processing performed by the succeeding stage neural networks are the display window determined in the preceding stage neural network. The display window is determined with most coarse precision in the first stage neural network 5a and is determined with finer precision in the second, third, and subsequent stage neural networks. This processing will be described in detail later.

In step #1070, the parameter NN is incremented to designate the next stage neural network. In step #1080, it is determined whether the processing is performed for all neural networks. If the processing is not performed for all the neural networks in step #1080, the flow returns to step #1050. If the processing is performed for all the neural networks in step #1080, the display window obtained at this time is determined as the optimum display window.

Figure 29:
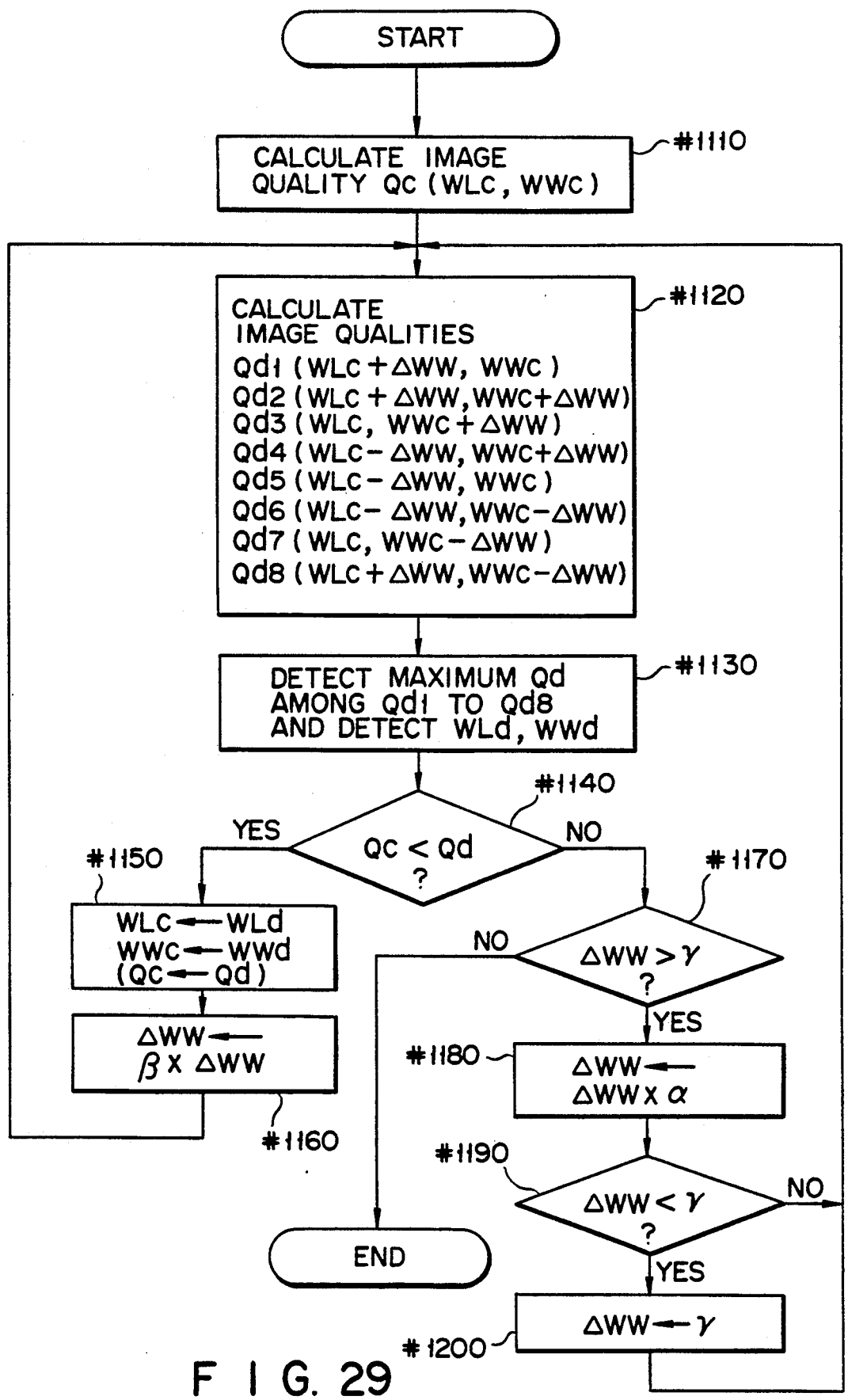
FIG. 29 is a flow chart showing processing of calculating image quality in the fifth embodiment.

The processing of obtaining the image quality by using the neural network 5 in step #1060 will be described in detail below with reference to FIG. 29. In step #1110, an image quality Qc of the image displayed by the display window including the candidate values WLc and WWc is calculated. This image quality Qc can be obtained in the same manner as in the second embodiment shown in FIG. 14. In step #1120, similar to the second embodiment, one or both of the window level and width are changed by ±Δ WW with respect to the candidate values, and image qualities Qd1 to Qd8 of the images displayed by the changed display window are calculated. The amount of change is not limited to the value Δ WW. In step #1130, a maximum image quality Qd is detected among the image qualities Qd1 to Qd8, and the window level WL and the window width WW corresponding to the image quality Qd are set as WLd and WWd, respectively. In step #1140, the image quality Qc obtained with the display window candidate values is compared with the image quality Qd obtained with the display window values slightly shifted from the candidate values to check whether Qc is smaller than Qd. If yes in step #1140, the display window corresponding to the image quality Qd are more suitable than the display window candidate. Therefore, WLc=WLd, WWc=WWd, and Qc=Qd are set in step #1150. That is, this corresponds to an event in which the candidate values of the window level and width move to the values corresponding to the image quality Qd as shown in FIG. 9. In step #1160, the amount of change Δ WW is multiplied by β, and the flow returns to step #1120. In this case, 1<β, i.e., the amount of change is increased.

If no in step #1140, the candidate values are determined to be suitable, and whether Δ WW>γ is checked in step #1170. In this case, γ is a constant for determining the end and was read out from the table shown in FIG. 28. If no in step #1170, it is determined that the candidate values WLc and WWc are the suitable window level and width WL and WW to be finally determined, the processing is ended. If yes in step #1170, in order to perform determination with a smaller amount of change, the amount of change Δ WW is multiplied by α in step #1180. In this case, α is a constant which satisfies 0<α<1 and 0<α×β<1. In step #1190, it is checked whether or not Δ WW<γ. If no in step #1190, the flow directly returns to step #1120. If yes in step #1190, γ is set as the amount of change Δ WW in step #1200, and the flow returns to step #1120. In this manner, according to the fifth embodiment, an optimum display window can be obtained from image quality by a hill climbing method.

Learning of the neural networks 5a and 5b will be described below. The first stage neural network 5a learns as described in the second embodiment. From the second and subsequent stage neural networks, however, in order to further improve precision, a sampling pitch of the display window for learning is set finer in a portion having a high image quality so that the networks learn different learning data. For this reason, the second stage neural network learns by a fine pitch in only a portion close to WLG and WWG set by a skilled operator. Note that is a single network is caused to learn by a fine pitch, not only a learning efficiency is decreased, but also errors may not be reduced upon learning because a dynamic range of the image in a portion close to the set values WLG and WWG are narrowed. Therefore, this learning method is impractical. The learning method for the second and subsequent stage networks is the same as that for the first stage network, but learning data is formed to be described below. However, learning data formation method is not limited to that of this embodiment.

One image learned by the first stage network is selected, and the total of 25 points (WLS, WWS) are sampled as the display windows for the selected image by using WLG−WWG/4, WLG−WWG/8, WLG, WLG+WWG/3, and WLG+WWG/4 as the window level WLS and WWG−WWG/4, WWG−WWG/8, WWG, WWG+WWG/8, and WWG+WWG/4 as the window width WWS. Similar to the second embodiment, five estimation item data, i.e., the brightness value MVPG, the brightness value AG, the area having the brightness value 12, the area having the brightness value 16.5, and the balance of brightness are calculated for each of the 25 windows (WLS, WWS) in steps #510 to #550 shown in FIG. 14 and used as input data for learning. Teacher data with respect to these windows (WLS, WWS) are defined as shown in FIG. 30 to form 25 sets of learning data. Subsequently, the 25 sets of learning data are formed for an arbitrary number of images. All of the formed learning data are repeatedly learned until the value of errors is reduced below a predetermined value.

In general, when a plurality of neural networks are used, the image qualities produced from the respective networks are different for the same display window, i.e., a problem is posed in so-called mismatching. In this embodiment, however, since the neural networks of plural stages are sequentially used for producing the image quality and searching of the optimum display window is independently performed to use an immediately preceding searching result as an initial value of the next searching, no such problem arises. Although the stages of networks in the illustrated embodiment is two, a system having three or more networks can be similarly practiced by setting a sampling pitch finer.

According to the fifth embodiment as described above, a plurality of neural networks learn data of coarse precision and data of fine precision, and the networks are used stepwise to obtain the optimum display window. Therefore, the display window for the clearer image can be set. In the fifth embodiment, a plurality of networks having the arrangement according to the second embodiment are used. However, a plurality of networks having the arrangement according to the third or fourth embodiment can be used.

Teacher data for use in the neural network shown FIG. 15 or 30 will be described below. The teacher data is an index denoting the clarity of the image displayed by a given window. It is necessary to define the teacher data to denote the clarity. Therefore, the difference between a brightness of the image displayed by a reference display window in which the operator feels the image is displayed at the clearest and a brightness of the image displayed by the given display window is evaluated and the teacher data is formed on the basis of the evaluation. Therefore, the image quality Qe of the image displayed by the given window is defined as follows:

$$Qe = -(K1 \times EW) + K2 \quad (13)$$

where each of K1 and K2 is the normalized coefficient and EW is the evaluation value for evaluating a difference between the image displayed by the reference display window and that by the given display window.

EW is defined by the following equation. This equation represents a weighted average per pixel of a square sum of a difference between the brightness (gray scale) of the image displayed by the reference display window and the brightness (gray scale) of the image displayed by the given display window. Assuming that $W(GSr) = 1$ in the following equation, the numerator of the equation represents a square sum of a difference between gray scales of pixels. Since the dominator represents the number of pixels, (numerator)/(dominator) represents the average per pixel. However, middle brightness is important in an image, and a shift at the maximum and minimum brightness values has no significant influence. Therefore, weighting is performed with regards to the reference brightness.

$$(EW)^2 = \left\{ \sum_{\text{all pixels}} W(GSr(x,y)) \times (GSs(x,y) - GSr(x,y))^2 \right\} / \sum_{\text{all pixels}} W(GSr(x,y)) \quad (14)$$

where GSr(x,y) is the gray scale of a pixel (x,y) with regards to the reference window, GSs(x,y) is the gray scale of the pixel (x,y) with regards to the given window, and W(GSr(x,y)) is the weighting coefficient in the gray scale GSr.

When the gray scale is represented by values of 0.5 to 16.5, a gray scale GS obtained when a pixel value PV(x,y) is displayed by a window (WL, WW) is given as follows:

$$GS = 0.5 (\text{if } PV \leq WL - (WW/2)) \quad (15)$$

$$GS = 16 \times (PV - WL)/WW + 8.5 \text{ (if } WL - (WW/2) < PV < WL + (WW/2))$$

$$GS = 16.5 (\text{if } WL + (WW/2) \leq PV)$$

W(GSr) is defined as follows:

$$W(GSr) = 0.1 (\text{if } GSR \leq 0.5) \quad (16)$$

$$W(GSr) = (GSr - 0.5) \times 0.9/6.5 + 1 (\text{if } 0.5 < GSr \leq 7.0)$$

$$W(GSr) = 1.0 (\text{if } 7.0 < GSr \leq 10.0)$$

$$W(GSr) = 0.1 - (GSr - 16.5) \times 0.9/6.5 (\text{if } 10.0 < GSr \leq 16.5)$$

$$W(GSr) = 0.1 (\text{if } 16.5 < GSr)$$

Equation (14) is rewritten as follows when the histogram of a pixel values used:

$$(EW)^2 = \quad (17)$$

$$\left\{ \sum_{\text{all } PVs} W(GSr(PV)) \times (GSs(PV) - GSr(PV))^2 \times H(PV) \right\} / \sum_{\text{all } PVs} \{W(GSr(PV)) \times H(PV)\}$$

where PV is the pixel value and H(PV) is the frequency of the pixel value PV.

The image quality Qe is defined as described above. It is necessary to demonstrate that the image quality Qe coincides with the human senses. Since Qe is a value normalized by EW, EW is compared with the human senses. This comparison method is as follows.

(1) 12 MR images of three patients are prepared.

(2) A radiographer sets an optimum display window, and the reference window is determined for each image.

(3) Six to seven display windows are set for each image. These display windows are set such that EW is varied as wide as possible (4) EW in each set window is calculated.

Figure 31:
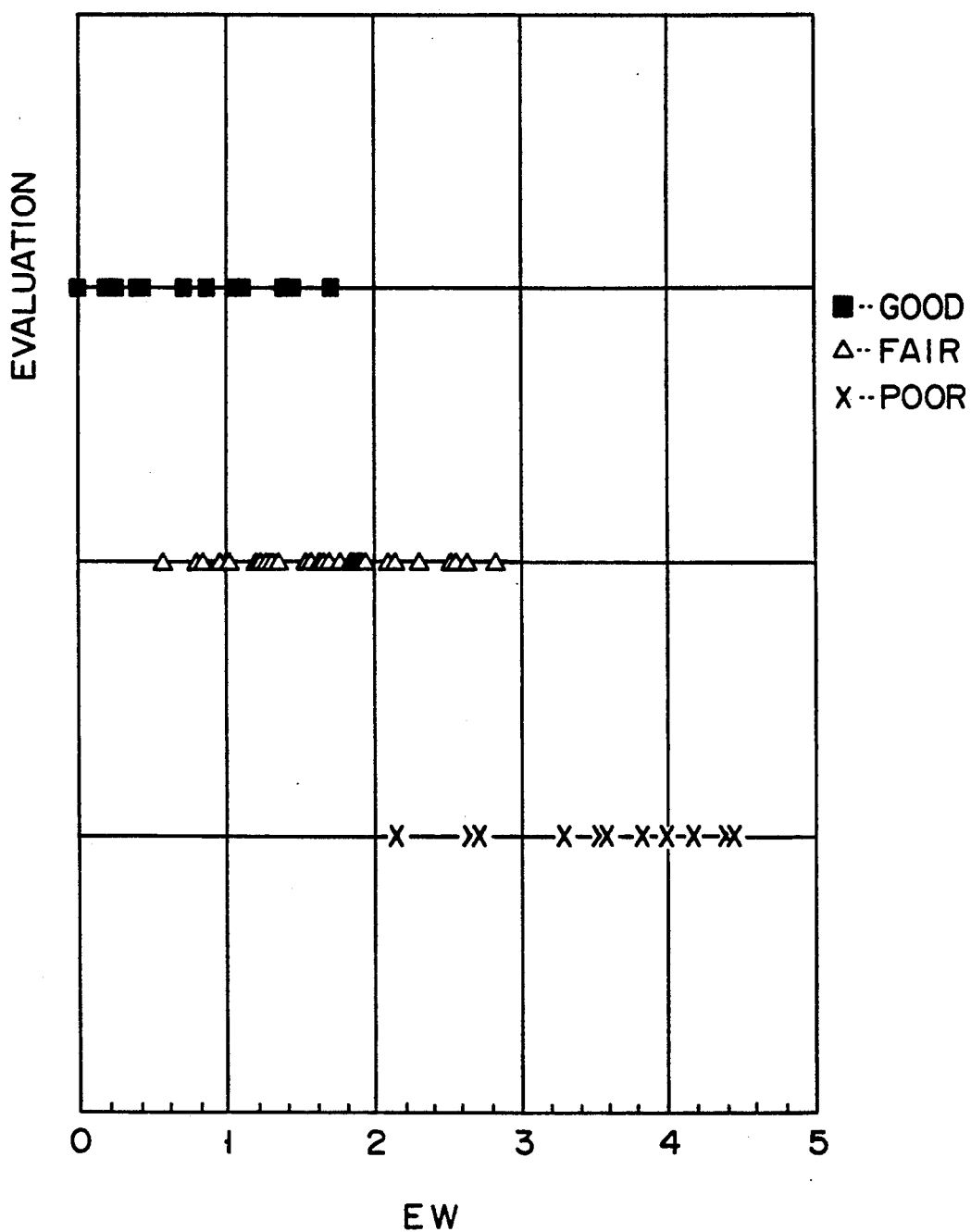
FIG. 31 shows a relationship between an evaluation value and an evaluation result by the operator to evaluate the display window set by the present invention.

(5) An image is displayed in each set window and e0aluated by the radiographer. The evaluation results are shown in FIG. 31. Referring to FIG. 31, evaluation is represented by:

(1) A display window is suitable, and the image is clear. . . . ■

(2) A display window is tolerable, but fine adjustment is required. . . . Δ

(3) An object to be scanned can be recognized but only unclearly. . . . ×

As is apparent from FIG. 31, EW coincides with the human senses.

If only WL of the set window is shifted from the reference window by one gray scale, $EW = 1$ is obtained since all of $GSs(x,y) - GSr(x,y)$ become 1. Man is said to recognize a difference of one gray scale. In other words, man does not much concern a difference within one gray scale. This also explains the experimental results.

Therefore, if the neural network learns the image quality Qe defined in the equation (13) as the teacher data, it is possible to learn the relationship between the input of the neural network and the clarity of the image.

In this case, the normalized coefficients K1 and K2 are determined as follows. That is, since the teacher data is 0 to 1, K2 is set to be 1. Since the system compares image qualities to search the highest image quality, the image quality can have a relative value. Therefore, since the range of EW is wide when the range of learning window is wide (i.e., if sampling is coarse), K1 is set to be about 1/10 for the first stage neural network. When the range of the learning window is narrow, K1 is set to be about 1/3 for the second stage network to widen the dynamic range. In either case, if a minimum value is obtained by the equation (13), Qe is set to be 0.

The relationship between the image quality Qe of the equation (13) and that of the equation (1) will be described. The image quality Qe defines the clarity of the image based on the brightness of the image. As described above, it is demonstrated that the image quality Qe coincides with the human senses. Therefore it has been assumed the Qe is correct. The equation (1) derives the clarity of the image based on the histogram of the pixel values. If the correlation between Q and Qe is large, it is possible to obtain the optimum display window of the first embodiment based on the image quality Q. In other words, it is necessary to tune the system so that the correlation between Q and Qe is enhanced. Since the image quality has a relative value, the normalized coefficient of the equation (13) need not be determined, but the correlation between Qe and Q is needed. For this purpose, minus correlation need only present between Q and EW. In other word, Q must be set or tuning must be performed so that the correlation between Q and EW is enhanced.

Figure 32:
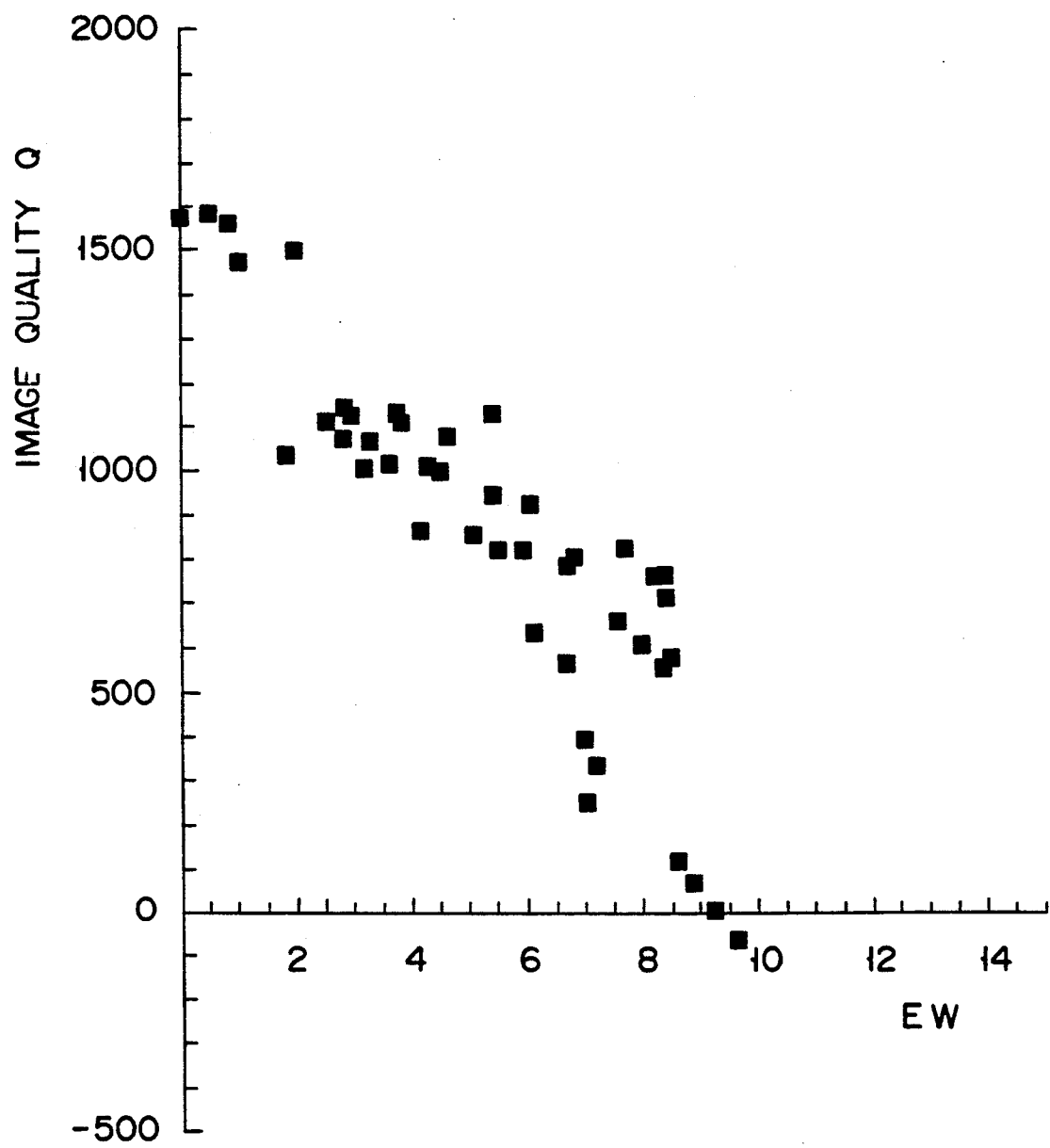
FIG. 32 shows a relationship between the evaluation value and the image quality

Q was calculated on the basis of currently set Fn and Wn and compared with EW. FIG. 32 shows the comparison result for one image. As shown in FIG. 32, this correlation coefficient is −0.89, i.e., a high minus correlation is obtained.

Although an object of the present invention is to set the window close to the reference window, EW can be used to evaluate the display window set by the present system. In this case, EW is calculated with respect to the display window set by the system. If the calculated EW is small, it can be determined that a display window close to the reference window is set. If the calculated EW is larger, it can be determined that a display window far from the reference window is set. In this case, as described above with reference to the experimental results, the value of EW can be considered as follows:

If $EW \leq 1$, the display window is suitable, and the image can be clearly seen.

If $1 < EW \leq 2.5$, the display window is tolerable, but fine adjustment is required.

If $2.5 < EW$, the object can be recognized but unclearly.

The present invention is not limited to the above embodiments but can be variously modified. For example, although the MR image is described in the above embodiments, an image need only be a digital image but is not limited to the medical image. Even if the medical image is used as the image, the image may be a CT image and may be obtained by A/D-converting an analog image such as a nuclear medical image, of an X-ray fluoroscopic image.

Modifications of the present invention will be described below.

In the above embodiments, both of the display window level and width are changed to detect a change in the image quality. However, one of the display window level and width may be fixed at the candidate value while the other is changed.

In the above embodiments, the histogram is formed for each image, and optimum values of the display window are determined for each image. However, all images belonging to the same group may be observed by the same display window. For example, the histogram is obtained from a plurality of slice images obtained by one volume scanning operation, and the display window is determined on the basis of the histogram, thereby observing a plurality of images by the same display window. In this case, images of the same group are observed by the same display window. In addition, the histogram of a plurality of images can be used to form the teacher data of the neural network. Images continuously obtained under the same scanning conditions are preferably observed by the same display window. Therefore, a display window selected by an operator for a first image (if fine adjustment is performed, the display window obtained after the fine adjustment) and the corresponding image quality are stored. If display of a second image is designated, the image quality of the second image with regards to the display window for the first image is calculated and compared with the image quality of the first image stored beforehand. If a difference between the two image qualities is a predetermined value or less, the display window is not changed, i.e., the second image is displayed with the display window for the first image. If the difference is more than the predetermined value, the display window for the second image is determined according to the present invention and the image are displayed with the determined display window. In order to observe images continuously obtained under the same scanning conditions with the same display window, the display window may be obtained with regards to the typical image (e.g., an image at a central position) of the same group so that all the images of the same group are displayed with the same display window.

Although the display window is linear within the display window width in the above embodiments, it may be nonlinear.

In the third embodiment, the MRI value assumed to be an observation object is searched, and the display window having the highest image quality with regards to the MRI value is determined. In order to simplify the calculations, however, the image qualities may be calculated on the basis of the following display windows. The display windows are arranged from that corresponding to the highest image quality, and the image is displayed by the display window from that which corresponds to the highest image quality and that which corresponds to the image quality in descending order each time the selection switch 10 is depressed. In this case, if an operator finds a comparatively suitable display window, he or she must operate the window switch 3 to finely adjust the display window manually. The display windows are selected as follows:

WL=LL−DD/4, LL−DD/8, LL, LL+DD/8, LL+DD/4
WW=3DD/4, 7DD/8, DD, 9DD/8, 5DD/4 where each of LL and DD is the constant.

In the third embodiment, an observation object is estimated on the basis of the peak of the histogram. However, the pixel value of the portion to be observed may be estimated by using the following information or method.

(1) A method of performing simple image recognition to find a portion in which pixel values are comparatively close to each other.

(2) Scanning conditions.

(3) Slices (an axial section, a coronal section, and a sagittal section).

(4) Scanning object which can be obtained by a hospital ordering system.

Items for calculating the image quality, the estimation function, the weight of the estimation function, the weight of each unit of the neural network may be selected in accordance with the above information and the features (e.g., an entire area, a peak position, a shape, and a height) of the histogram.

In the third embodiment, the display windows for all the objects are calculated in advance, and the image is displayed with the calculated window suitable for the object when the selection switch 10 is depressed. However, the display window suitable for the object may be calculated each time the selection switch is depressed.

Modifications of obtaining the image quality by means of the neural network will be described below. Although the same weighting coefficient is used for all the images in the above embodiments, the weighting coefficient may be selected in accordance with the type of the image. In this case, the weighting coefficient is transferred from the window controller 2 to the neural network 5 in accordance with the type of the image. In addition, learning is performed by selecting the learning data in accordance with the type of the image data. The type of the image may be determined by the following information or method.

(1) A method of performing simple image recognition to find a portion in which pixel values are comparatively close to each other.

(2) Scanning conditions.

(3) Slices (an axial section, a coronal section, and a sagittal section).

(4) Scanning object which can be obtained by a hospital ordering system.

(5) Features (e.g., the entire area, the peak position, the shape, and the height) of the histogram.

Although selection of the image of learning is not described in the above embodiments, about ten images (for each image type), for example, are stored as the learning images for each equipment, and the neural network is caused to learn on the basis of these images. In this manner, the neural network (weighting coefficient) suitable for the equipment is formed. When the entire learning images obtained by adding new learning images or updating old images into new images are used again to perform learning, the system can cope with a change in equipment. Alternatively, instead of setting the weighting coefficient for each equipment and each image type, the weighting coefficient may be set in accordance with the equipment, an operator (doctor), and the type of the image.

In the above embodiments, estimation item data to be input to the neural network are linearly normalized values. However, normalization may be performed by using the sine function or logarithmic transformation.

Although the number of estimation items coincides with the number of units in the input layer of the neural network in the above embodiments, a plurality of units may be assigned to one estimation item, and a value obtained by linearly normalizing the estimation item and a value obtained by normalization using the sine function or logarithmic transformation may be respectively input.

In the above embodiments, the number of output units is one, and this output unit represents the image quality including both brightness and contrast. However, two output units may be used in correspondence with brightness and contrast such that the brightness is represented as "too bright—suitable—too dark" (0 to 1) and the contrast is represented as "too strong—suitable—too weak" (0 to 1). In this case, the image quality is calculated as a weighting sum of the two factors from the two output units. Teacher data of the brightness is set as WWS=WWG in FIG. 15 and teacher data of the contrast is set as WLS=WLG therein.

Furthermore, in the above embodiments, learning and execution are performed by the same neural network. However, learning may be performed by another neural network such as included in a work station while execution is performed by another simple neural network. In addition, of the weighting coefficients of the neural network which finishes its learning, only the weighting having large values are extracted and calculated by only the software of a computer without using the neural network.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A digital image display apparatus, comprising:
means for calculating a frequency distribution of a plurality of pixel values corresponding to digital image data;
means for calculating a plurality of image qualities for each of said plurality of pixel values, said image qualities indicating clarity of a display image based on the calculated frequency distribution when the digital image data is to be displayed in accordance with a plurality of pixel value-to-brightness conversion modes;

means for selecting one of said plurality of pixel value-to-brightness conversion modes on the basis of said plurality of image qualities; and means for displaying the digital image data in accordance with pixel value-to-brightness conversion mode selected by said selecting means.

2. An apparatus according to claim 1, in which said selecting means comprises means for selecting a pixel value-to-brightness conversion mode indicating maximum image quality.

3. An apparatus according to claim 1, further comprising means for setting, as original candidate values, initialized window level and window width values, and means for shifting said original candidate values by predetermined amounts, wherein said conversion mode is a display window of a display unit, said image quality calculating means comprising:

first means for calculating first image qualities for a first display window of said original candidate values and a second display window having window level and window width values shifted from the original candidate values by said predetermined amounts;

second means for imputting, when the image qualities for the second display window are greater than the image qualities of the first display window, the second display window with the image qualities of the second display window as new candidate values; and third means for decreasing, when the image qualities of the new candidate values are maximum, the predetermined amount of said first means.

4. An apparatus according to claim 1, in which said image quality calculating means comprises:

first means for calculating first data indicating brightness of the display image, second data indicating contrast of the display image, and third data indicating a balance of brightness, in accordance with the frequency distribution of the pixel value; and second means for calculating the image quality on the basis of the first to third data.

5. An apparatus according to claim 4, in which said second means comprises means for adding data which are obtained by converting the first to third data with a nonlinear function and are weighted by a predetermined value to calculate the image quality.

6. An apparatus according to claim 4, in which said second means comprises a neural network for inputting normalized data of the first to third data and outputting the image quality.

7. An apparatus according to claim 4, in which the first data includes brightness data of a pixel value having a highest frequency and brightness data of a pixel value at a boundary between a background and an image on a histogram indicating the frequency distribution, the second data includes area data of a portion having middle brightness within a display brightness range and area data of a portion having maximum brightness within the range, and the third data includes data indicating a ratio between an area of a portion having brightness higher than the middle brightness and an area of a portion having brightness lower than the middle brightness.

8. An apparatus according to claim 1, in which said image quality calculating means comprises means for calculating the image quality indicating clarity of each portion to be observed of one image, and said selecting means comprises means for selecting one conversion mode for each portion.

9. An apparatus according to claim 8, in which said each portion is a portion corresponding to each peak frequency of the frequency distribution.

10. An apparatus according to claim 1, in which the conversion mode is defined by a window width and a window level.

11. A digital image conversion apparatus for converting first type digital image data into second type digital image data, comprising:

means for calculating a frequency distribution of a plurality of pixel values corresponding to said first type digital image data;

means for calculating a plurality of image qualities for each of said plurality of pixel values, said image qualities indicating clarity of a display image based on the calculated frequency distribution when the second type digital image data is to be displayed in accordance with a plurality of first type digital image data-to-second type digital image data conversion modes; and means for selecting one of said plurality of first type digital image data-to-second type digital image data conversion modes in accordance with one of said plurality of calculated image qualities; and means for converting the first type digital image data into the second type digital image data using the first type digital image data-to-second type digital image data conversion mode selected by said selecting means; and means for displaying the second type digital image data converted using the selected conversion mode.

12. An apparatus according to claim 11, in which said selecting means comprises means for selecting a pixel value-to-brightness conversion mode indicating maximum image quality.

13. An apparatus according to claim 11, in which said conversion mode is a display window of said display means, and said image quality calculating means comprises:

first means for calculating the image qualities in the display window set as a candidate and the display window shifted from the candidate by a predetermined amount;

second means for inputting, when the image quality in the display window different from the candidate is maximum, the display window having the maximum image quality as a new candidate; and third means for decreasing, when the image quality of the candidate is maximum, the predetermined amount of said first means.

14. An apparatus according to claim 11, in which said image quality calculating means comprises:

first means for calculating first data indicating brightness of the display image, second data indicating contrast of the display image, and third data indicating a balance of brightness, in accordance with the frequency distribution of the pixel value; and second means for calculating the image quality on the basis of the first to third data.

15. An apparatus according to claim 14, in which said second means comprises means for adding data which are obtained by converting the first to third data wit a nonlinear conversion function and are weighted by a predetermined value to calculate the image quality.

16. An apparatus according to claim 14, in which said second means comprises a neural network for inputting normalized data of the first to third data and outputting the image quality.

17. An apparatus according to claim 14, in which the first data includes brightness data of a pixel value having a highest frequency and brightness data of a pixel value at a boundary between a background and an image on a histogram indicating the frequency distribution, the second data includes area data of a portion having middle brightness within a display brightness range and area data of a portion having maximum brightness within the range, and the third data includes data indicating a ratio between an area of a portion having brightness higher than the middle brightness and an area of a portion having brightness lower than the middle brightness.

18. An apparatus according to claim 11, in which said image quality calculating means comprises means for calculating the image quality indicating clarity of each portion to be observed of one image, and said selecting means comprises means for selecting one conversion mode for each portion.

19. An apparatus according to claim 18, in which said each portion is a portion corresponding to each peak frequency of the frequency distribution.

20. An apparatus according to claim 11, in which the conversion mode is defined by a window width and a window level.

21. A digital image display apparatus for converting a plurality of pixel values corresponding to digital image data into a brightness values for display such that only pixel values within a predetermined range of values are converted into brightness values, comprising:
 means for calculating a frequency distribution of a plurality of pixel values corresponding to the digital image data;
 means for calculating a plurality of predetermined parameters related to the frequency distribution;
 neural network means, connected to said calculating means, for receiving the plurality of predetermined parameters related to the frequency distribution and outputting a maximum image quality indicating clarity of the image;
 means for determining said predetermined range in accordance with the output from said neural network; and
 means for displaying the digital image data corresponding to the pixel values within said predetermined range of values.

22. An apparatus according to claim 21, in which said optimum value determining means comprises:
 means for determining a candidate of said predetermined range;
 means for calculating the image quality of the candidate and the image quality obtained when the center of said predetermined range varies or when said predetermined range varies; and
 means for changing the candidate such that the image quality of the candidate is maximized and repeatedly calculating and comparing the image quality of the candidate and the image quality obtained when the center of said predetermined range varies or when said predetermined range varies.

23. An apparatus according to claim 22, in which said neural network means comprises at least two neural networks each having at least three layers and learning a different data in precision, and said optimum value determining means determines an optimum value by using said neural networks sequentially from a neural network learning a low precision data, so that an output from each neural network is used as a candidate in processing performed by the next neural network.

24. An apparatus according to claim 21, further comprising means for generating first data indicating brightness of a display image, second data indicating contrast of the display image and third data indicating a balance of brightness, in which said neural network means receives said first data, second data, and third data on the basis of the frequency distribution.

25. An apparatus according to claim 24, in which the first data includes brightness data of a pixel value having a highest frequency and brightness data of a pixel value at a boundary between a background and an image on a histogram indicating the frequency distribution, the second data includes area data of a portion having middle brightness within a display brightness range and area data of a portion having maximum brightness within the range, and the third data includes data indicating a ratio between an area of a portion having higher brightness than the middle brightness and an area of a portion having lower brightness than that.

26. An apparatus according to claim 25, in which said neural network means produces the image quality indicating clarity of each portion to be observed in one image, and the brightness data of a pixel value having a highest frequency includes brightness data of a pixel value at each peak in the frequency distribution.

27. A digital image display apparatus for converting pixel values within a window width centering a window level for display of a digital image, in which each pixel value is represented by a digital signal, into brightness values and displaying the digital image data based on the brightness values comprising:
 means for setting a window level and a window width to predetermined candidate values;
 first means for calculating a first image quality value indicating, by means of an index, clarity of an image displayed when the digital image is to be displayed based on the window level and the window width set to be the predetermined candidate values;
 means for setting at least one of the window level and the window width to a value which is shifted from the predetermined candidate value by a predetermined value;
 second means for calculating a second image quality value when the digital image is to be displayed based on the window level and the window width, wherein at least one of the window level and the window width is shifted from the candidate values by the predetermined value;
 third means for comparing the first image quality value calculated by said first means and the second image quality value calculated by said second means; and
 means for changing the candidate values and decreasing said predetermined value in accordance with the comparison result, repeatedly operating said first, second, and third means so that a maximum image quality is obtained by said first means, and setting the candidate values set in said first means as the optimum window level and width; and means for displaying the digital image data having said optimum window level and window width.

28. An apparatus according to claim 27, further comprising a selecting means for selecting a pixel value-to-brightness conversion mode indicating maximum image quality.

29. An apparatus according to claim 27, further comprising means for setting, as original candidate values, initialized window level and window width values, and means for shifting said original candidate values by predetermined amounts, wherein said conversion mode is a display window of a display unit, said image quality calculating means comprising:

first means for calculating first image qualities for a first display window of said original candidate values and a second display window having window level and window width values shifted from the original candidate values by said predetermined amounts;

second means for inputting, when the image qualities for the second display window are greater than the image qualities of the first display window, the second display window with the image qualities of the second display window as new candidate values; and third means for decreasing, when the image qualities of the new candidate values are maximum, the predetermined amount of said first means.

30. An apparatus according to claim 27, wherein said image quality calculating means comprises:

first means for calculating first data indicating brightness of the display image, second data indicating contrast of the display image, and third data indicating a balance of brightness, in accordance with the frequency distribution of the pixel value; and second means for calculating the image quality on the basis of the first to third data.

31. An apparatus according to claim 30, wherein said second means comprises means for adding data which are obtained by converting the first to third data with a nonlinear function and are weighted by a predetermined value to calculate the image quality.

32. An apparatus according to claim 30, wherein said second means comprises a neural network for inputting normalized data of the first to third data and outputting the image quality.

33. An apparatus according to claim 30, wherein the first data includes brightness data of a pixel value having a highest frequency and brightness data of a pixel value at a boundary between a background and an image on a histogram indicating the frequency distribution, the second data including area data of a portion having middle brightness within a display brightness range and area data of a portion having a maximum brightness within the range, and the third data includes data indicating a ratio between an area of a portion having brightness higher than the middle brightness and an area of a portion having brightness lower than the middle brightness.

34. An apparatus according to claim 27, wherein said image quality calculating means comprises means for calculating the image quality indicating clarity of each portion to be observed of one image, and said selecting means comprises means for selecting one conversion mode for each portion.

35. An apparatus according to claim 34, wherein said each portion is a portion corresponding to each peak frequency of the frequency distribution.

36. An apparatus according to claim 27, wherein the conversion mode is defined by a window width and a window level.

* * * * *